(12) United States Patent
Gaines et al.

(10) Patent No.: US 10,900,606 B2
(45) Date of Patent: Jan. 26, 2021

(54) MOBILE FOLDABLE INSTRUMENT STAND

(71) Applicant: JDL Gear LLC, Hobe Sound, FL (US)

(72) Inventors: Jodi Lynn Gaines, Hobe Sound, FL (US); Lionel David Rea, Durham, CT (US); Eleni Marie Skiba, Boca Raton, FL (US)

(73) Assignee: JDL GEAR LLC, Hobe Sound, FL (US)

( * ) Notice: Subject to any disclaimer, the term of this patent is extended or adjusted under 35 U.S.C. 154(b) by 0 days.

(21) Appl. No.: 15/929,837

(22) Filed: May 26, 2020

(65) Prior Publication Data

US 2020/0370706 A1 Nov. 26, 2020

Related U.S. Application Data

(60) Provisional application No. 62/852,430, filed on May 24, 2019.

(51) Int. Cl.
| | |
|---|---|
| *G10G 5/00* | (2006.01) |
| *F16M 11/38* | (2006.01) |
| *B62B 1/12* | (2006.01) |
| *B62B 1/26* | (2006.01) |

(52) U.S. Cl.
CPC ............ *F16M 11/38* (2013.01); *B62B 1/125* (2013.01); *B62B 1/26* (2013.01); *G10G 5/00* (2013.01); *B62B 2206/06* (2013.01)

(58) Field of Classification Search
CPC ........... F16M 11/38; B62B 1/125; B62B 1/26; B62B 2206/06; G10G 5/00
See application file for complete search history.

(56) References Cited

U.S. PATENT DOCUMENTS

| | | | |
|---|---|---|---|
| 3,958,786 | A | 5/1976 | Mann |
| 5,029,796 | A | 7/1991 | Schoenig |
| 5,383,634 | A | 1/1995 | Liao |
| 5,505,413 | A | 4/1996 | Hennessey |
| 6,145,801 | A | 11/2000 | Herring, Jr. |
| 6,323,406 | B1 | 11/2001 | Park |

(Continued)

FOREIGN PATENT DOCUMENTS

| | | |
|---|---|---|
| EP | 1239452 A2 | 9/2002 |
| JP | 2006337894 A | 12/2006 |
| JP | 5237484 B1 | 4/2013 |

OTHER PUBLICATIONS

"Costway Foldable 2 Wheel Push Pull Golf Cart /Cup Holder Trolley Swivel Steel Light (2 Wheel)" Retrieved from: https://www.walmart.com/ip/Costway-Foldable-2-Wheel-Push-Pull-Golf-Cart-Cup-Holder-Trolley-Swivel-Steel-Light-2-Wheel/123026979 Retrieved on: Feb. 12, 2019 (3 pages total).

(Continued)

*Primary Examiner* — Kimberly R Lockett
(74) *Attorney, Agent, or Firm* — William J. Connelly, III; Maldjian Law Group LLC

(57) ABSTRACT

The invention features a mobile foldable instrument stand that functions as both an instrument stand and a mode of transport. The mobile foldable instrument stand comprises a base, an adjustable spine attached to the base, a wheel, a rotatably hinged handle and fork to support and hold an instrument and an elastic cord to further secure the instrument to the mobile foldable instrument stand. The mobile foldable instrument stand is foldable for ease of storage.

20 Claims, 23 Drawing Sheets

(56) References Cited

U.S. PATENT DOCUMENTS

| | | |
|---|---|---|
| 6,422,522 B1 | 7/2002 | Woollen |
| 6,484,977 B1 | 11/2002 | Yu |
| 6,540,182 B1 | 4/2003 | Wifer |
| 7,208,666 B2 | 4/2007 | Burch et al. |
| 7,470,843 B2 | 12/2008 | Hsieh |
| 7,717,377 B1 | 5/2010 | Corrado |
| 7,900,881 B2 | 3/2011 | Campagna |
| 8,063,291 B2 | 11/2011 | Crowder et al. |
| 8,362,345 B1 | 1/2013 | Rice |
| 8,967,585 B2 | 3/2015 | Furuta et al. |
| 9,754,567 B1 * | 9/2017 | Griffin .................. G10G 5/005 |
| 2015/0194139 A1 | 7/2015 | Yu |
| 2017/0032773 A1 | 2/2017 | Smith, IV |

OTHER PUBLICATIONS

"Peak Universal Traveler Guitar Stand" Retrieved from: https://travelerguitar.com/products/peak-universal-traveler-guitar-stand Retrieved on: Feb. 12, 2019 (1 page total).

"Quiklok" Retrieved from: https://www.quiklok.it/en/quiklok/ql791 Retrieved on: Feb. 12, 2019 (5 pages total).

"Travlite Acoustic Guitar Stand" Retrieved from: http://herculesstands.com/international/products/fretted-and-bowed-instrument/guitar/single-stands/gs301b/ Retrieved on: Feb. 11, 2019 (1 page total).

"Shoksafe Guitar Stand" Retrieved from: http://herculesstands.com/international/products/fretted-and-bowed-instrument/guitar/single-stands/gs405b/ Retrieved on: Feb. 11, 2019 (1 page total).

"Auto Grip System (AGS) Single Guitar Stand W/Backrest" Retrieved from: http://herculesstands.com/international/products/fretted-and-bowed-instrument/guitar/single-stands/gs412b/ Retrieved on: Feb. 11, 2019 (1 page total).

* cited by examiner

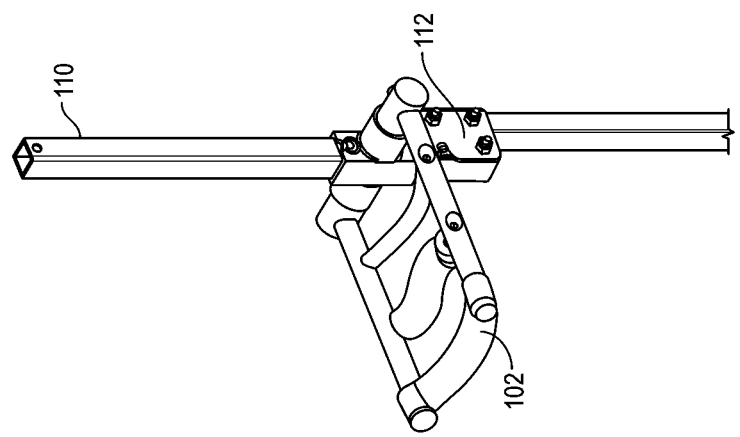
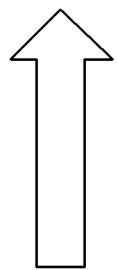
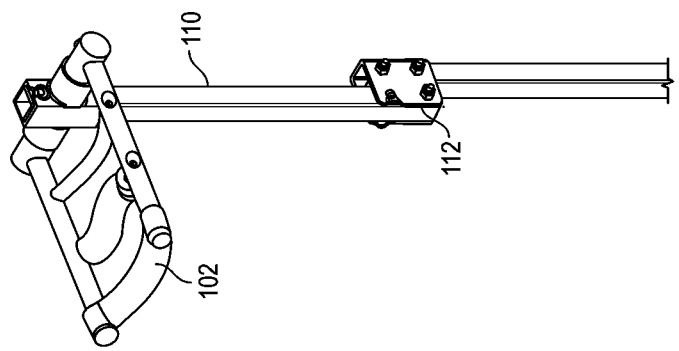
FIG. 3A

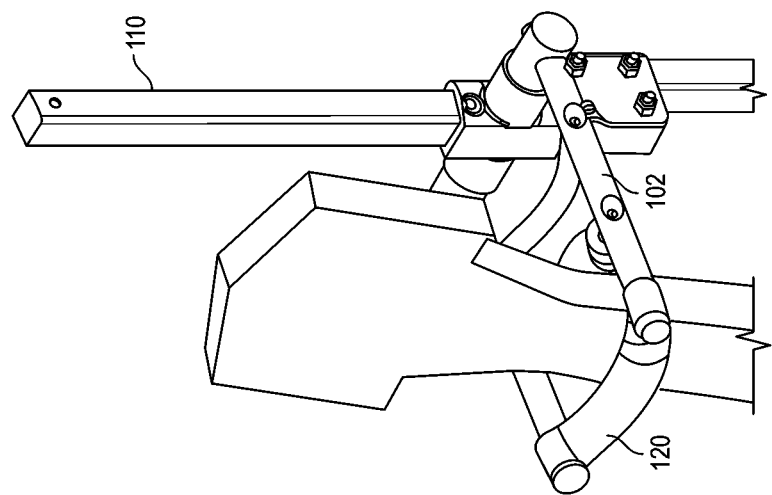
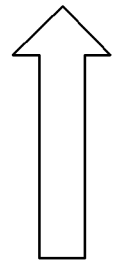
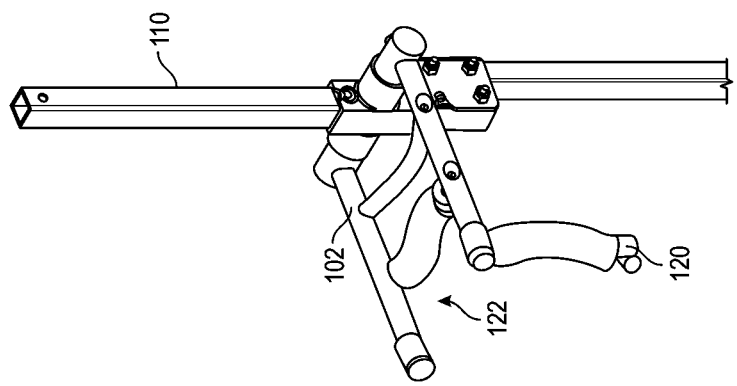
FIG. 3B

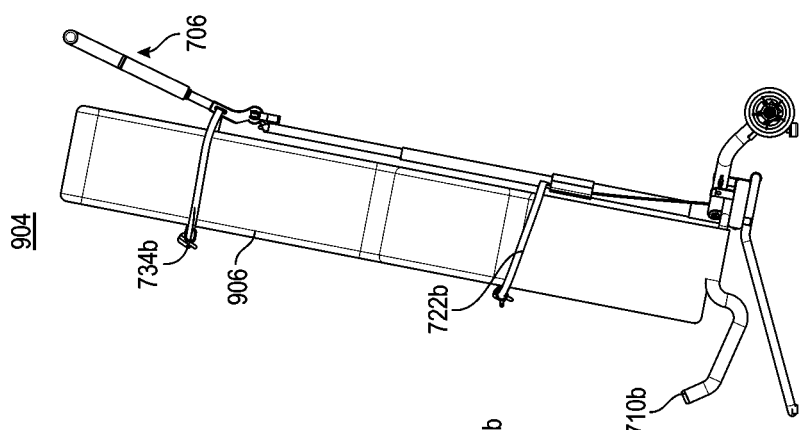
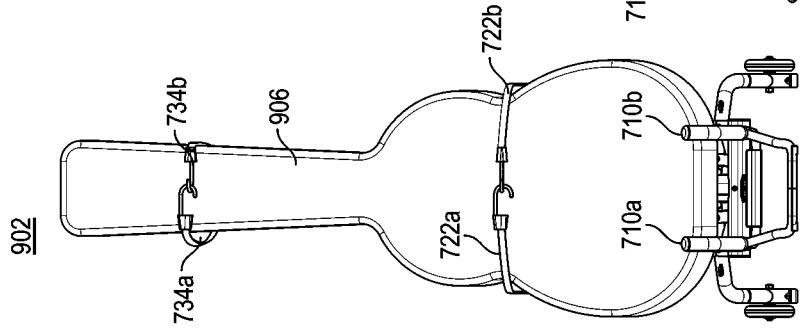
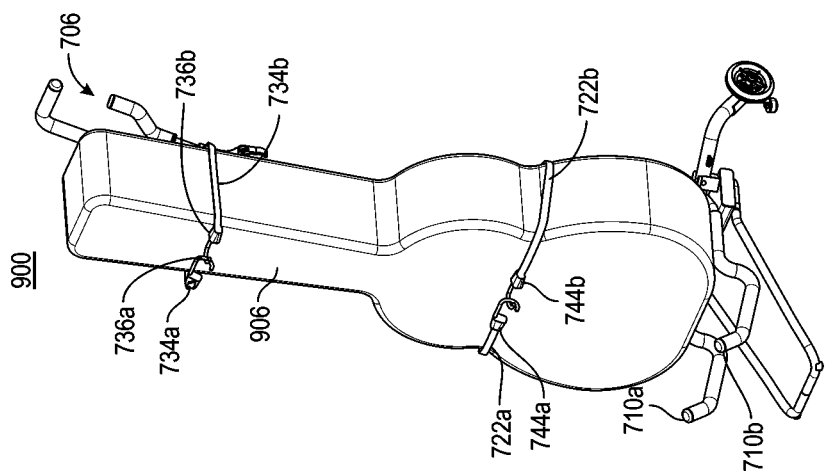

MOBILE FOLDABLE INSTRUMENT STAND

CROSS-REFERENCE TO RELATED APPLICATIONS

This application claims the benefit of U.S. Provisional Application Ser. No. 62/852,430 filed May 24, 2019, entitled "Mobile Foldable Instrument Stand", which is incorporated herein by reference in its entirety.

FIELD OF INVENTION

Embodiments disclosed herein relate, in general, to a foldable instrument stand, and more particularly, to a mobile foldable and/or collapsible instrument stand for holding and transporting objects, such as instruments.

BACKGROUND

Musicians play in a variety of settings, both indoors and outdoors, and as part of their trade, musicians must carry their often cumbersome instruments and accessories along with them. In addition to the instruments themselves, accessories often include instrument cases, instrument stands, instrument carts, and so forth. As such, musicians often struggle with having to own, travel and perform with multiple instruments and accessories due to their combined weight and the overall cumbersome nature of the goods involved.

For example, conventional instrument stands, such as a hand cart, may be used to transport an instrument and accompanying case through airport security, the terminal gate and ultimately onboard an aircraft. However, an airline often requires the accompanying hand cart to be checked-in at the terminal gate for an additional fee due to its larger size or will charge an additional baggage fee to bring the accompanying hand cart onboard the aircraft. In essence, musicians need to carry two separate bulky instrument stands (e.g., a cart and a case) of the accompanying instrument as well as any additional carry-on luggage/bags for which an airline will often charge an additional fee. Moreover, conventional carts are not designed for use with all instruments, such as a round-shaped guitar. Also, the conventional hand carts do not collapse small enough to fit into a backpack for ease of transport and often fail to provide a sturdy enough base to prevent tipping when stationary. Even if the conventional hand carts are capable of collapsing to a smaller size, they do not have embodiments or characteristics on which the instrument can be conveniently leaned, such as a heightened backrest, nor are they able to serve as a stationary stand for an instrument when a musician is performing onstage.

Further, while some conventional instrument stands and/or stands do have backrests, they are designed to collapse only partially. In addition, conventional instrument stands often have a neck stabilizer, also referred to as a "yoke". For example, when using a conventional stand, the weight of the instrument is often used to secure the instrument in place. Some conventional stands provide a channel to accept an instrument with other conventional stands having an additional yoke wherein a channel slides down and rotates two arms for holding and protecting the instrument. In addition, there are some conventional stands having a weight activated yoke wherein the weight of the instrument itself activates the yoke's spring gates to secure the instrument. However, standard backrests and conventional instrument stands do not provide the user with the option of a hinged yoke serving the dual purpose of both a handle for transport in a mobile mode and a yoke for securing an instrument in a stationary mode.

Thus there is a need for a mobile foldable instrument stand to overcome the above discussed shortcomings.

SUMMARY

Embodiments in accordance with the present invention provide a mobile foldable instrument stand. The mobile foldable instrument stand comprising: a base to provide a rigid support to the mobile foldable instrument stand. Further, the mobile foldable instrument stand comprising a telescopic spine, attached to the base, is adjusted in one of, a cart mode, a stand mode, or a folded mode. Further, the mobile foldable instrument stand comprising a handle, attached to a proximal end of the telescopic spine, comprising a plurality of hollow tubes. Further, the mobile foldable instrument stand comprising a plurality of forks, attached to the base, to hold an instrument when the instrument is inserted into the handle and placed on the plurality of forks. Further, the mobile foldable instrument stand comprising a plurality of upper bungee cords, wherein each of the plurality of upper bungee cords comprising: a first end, wherein the first end of each of the plurality of upper bungee cords is anchored within each of the plurality of hollow tubes of the handle; and a second end, wherein the second end of each of the plurality of upper bungee cords comprises a plurality of hooks for securing the instrument within the mobile foldable instrument stand. Further, the mobile foldable instrument stand comprising a plurality of lower bungee cords, wherein each of the plurality of lower bungee cords comprising: a first end, wherein the first end of each of the plurality of lower bungee cords is anchored at a bottom end of the telescopic spine, wherein each of the plurality of lower bungee cords passes through a plurality of guide holes of a back-rest; and a second end, wherein the second end of each of the plurality of lower bungee cords comprises a plurality of hooks for securing the instrument within the mobile foldable instrument stand.

Embodiments in accordance with the present invention provide a mobile foldable instrument stand. The mobile foldable instrument stand comprising: a base to provide a rigid support to the mobile foldable instrument stand. Further, the mobile foldable instrument stand comprising a telescopic spine, attached to the base, is adjusted in one of, a cart mode, a stand mode, or a folded mode by using a button. Further, the mobile foldable instrument stand comprising a handle, attached to a proximal end of the telescopic spine, comprising a plurality of hollow tubes, wherein the handle is rotated to an angle of 270 degrees. Further, the mobile foldable instrument stand comprising a plurality of forks, attached to the base, to hold an instrument when the instrument is inserted into the handle and placed on the plurality of forks. Further, the mobile foldable instrument stand comprising a plurality of upper bungee cords, wherein each of the plurality of upper bungee cords comprising: a first end, wherein the first end of each of the plurality of upper bungee cords is anchored within each of the plurality of hollow tubes of the handle; and a second end, wherein the second end of each of the plurality of upper bungee cords comprises a plurality of hooks for securing the instrument within the mobile foldable instrument stand. Further, the mobile foldable instrument stand comprising a plurality of lower bungee cords, wherein each of the plurality of lower bungee cords comprising: a first end, wherein the first end of each of the plurality of lower bungee cords is anchored at a bottom end of the telescopic spine, wherein each of the plurality of lower bungee cords passes through a plurality of guide holes of a back-rest; and a second end, wherein the second end of each of the plurality of lower bungee cords comprises a plurality of hooks for securing the instrument within the mobile foldable instrument stand. Further, the mobile foldable instrument stand comprising a plurality of wheels attached to the base through a plurality of legs for enabling a movement of the mobile foldable instrument stand.

Embodiments in accordance with the present invention provide a mobile foldable instrument stand. Further, the mobile foldable instrument stand comprising a base to provide a rigid support to the mobile foldable instrument stand. Further, the mobile foldable instrument stand comprising an adjustable spine, attached to the base, is adjusted in one of, a cart mode, a stand mode, or a folded mode by using a button. Further, the mobile foldable instrument stand comprising a handle, attached to the adjustable spine, comprising a lever for holding an instrument, wherein the handle is rotated to an angle of 270 degrees. Further, the mobile foldable instrument stand comprising a plurality of forks, attached to the base, to hold the instrument when the instrument is inserted into the handle and placed on the plurality of forks. Further, the mobile foldable instrument stand comprising a bungee cord, wherein the bungee cord securely holds the instrument within the mobile foldable instrument stand. Further, the mobile foldable instrument stand comprising a plurality of wheels attached to the base through a plurality of legs for enabling a movement of the mobile foldable instrument stand from one place to another. Further, the mobile foldable instrument stand comprising a plurality of bumpers attached near the plurality of wheels for providing a stable support to the mobile foldable instrument stand in the stand mode.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein:

FIG. 3A illustrates a movement of the handle over an adjustable spine of the mobile foldable instrument stand, according to an embodiment of the present invention;

FIG. 3B illustrates an instrument held within a yoke of the handle, according to an embodiment of the present invention;

FIG. 9A illustrates a right side perspective view of the mobile foldable instrument stand in the cart mode holding an instrument case, according to another embodiment of the present invention;

FIG. 9B illustrates a front view of the mobile foldable instrument stand in the cart mode holding the instrument case, according to another embodiment of the present invention;

FIG. 9C illustrates a side view of the mobile foldable instrument stand in the cart mode holding the instrument case, according to another embodiment of the present invention.

Figure 1:
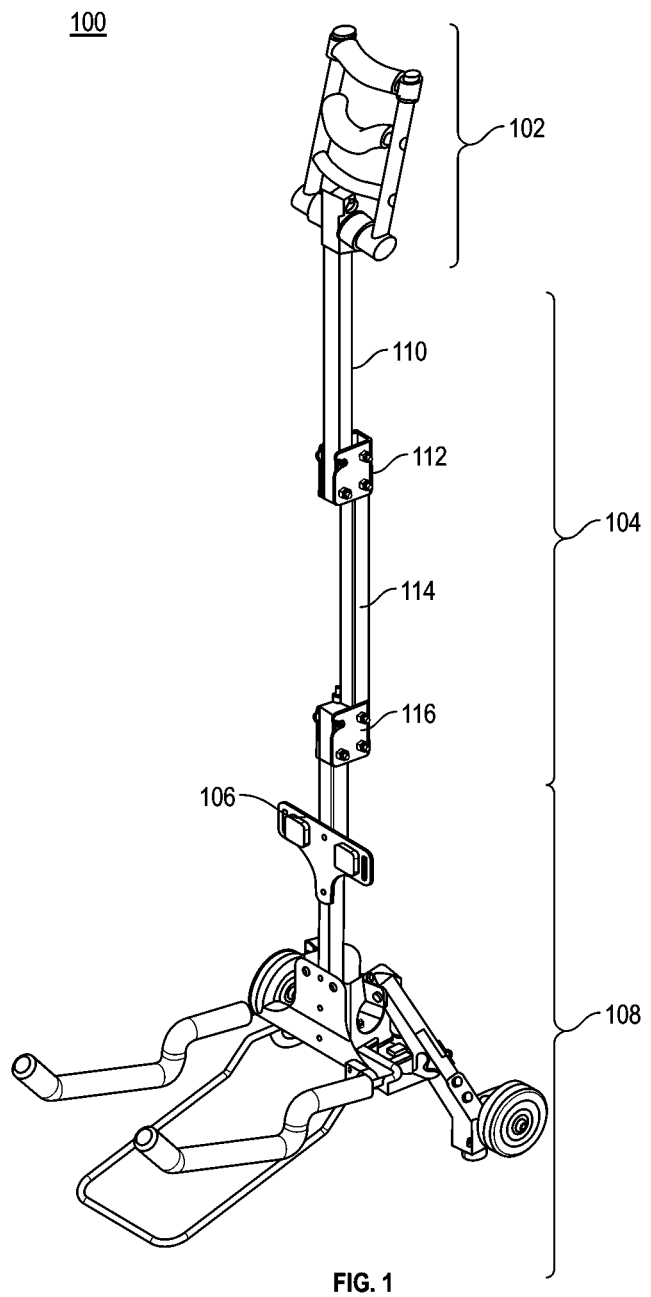
FIG. 1 illustrates a perspective view of a mobile foldable instrument stand, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a perspective view of a mobile foldable instrument stand 100, according to an embodiment of the present invention. The mobile foldable instrument stand 100 comprises a handle 102, an adjustable spine 104, a backrest 106, and a cradle 108.

Figure 6:
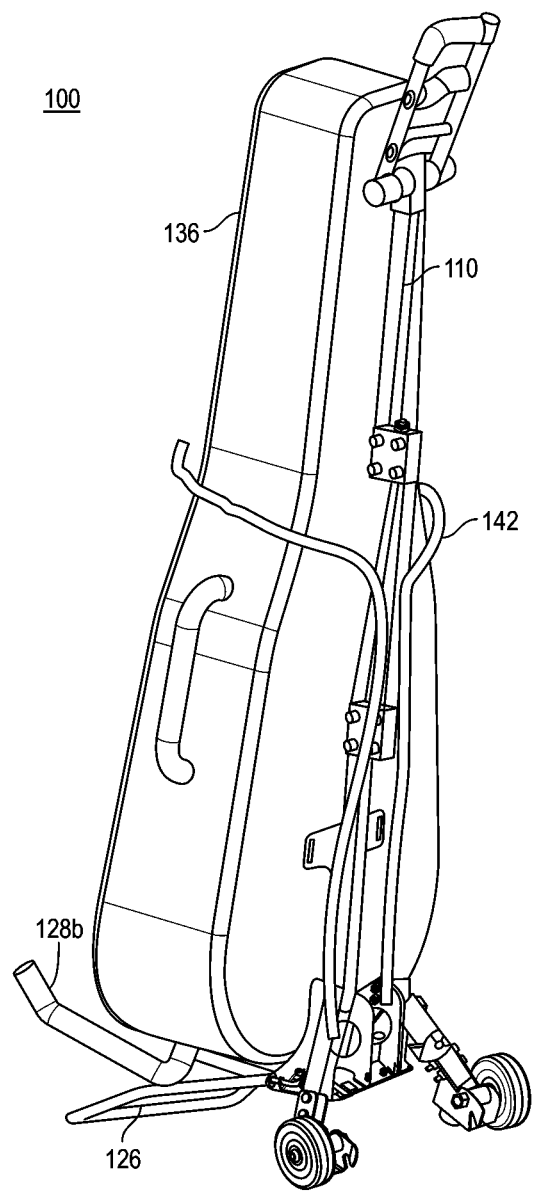
FIG. 6 illustrates the mobile foldable instrument stand in the stand mode holding an instrument having an instrument case, according to an embodiment of the present invention.

The handle 102 may be used to pull the mobile foldable instrument stand 100 in a cart mode and/or a stand mode. Further, the handle 102 may be capable of converting to a yoke to hold and secure an instrument 136 (as shown in FIG. 6) in a stationary position such as, a stand mode. According to embodiments of the present invention, the cart mode may be defined as a mode in which the mobile foldable instrument stand 100 is unfolded (or in a deployed position) and is then used to securely transport the instrument 136 from one place to another. The handle 102 may be attached to the adjustable spine 104 by using nuts and bolts, according to an embodiment of the present invention. In another embodiment of the present invention, the handle 102 may be attached to the adjustable spine 104 by a hinge mechanism to enable the handle 102 to be rotated to and to be converted into the yoke for securing the instrument 136.

According to embodiments of the present invention, the adjustable spine 104 comprises an upper spine 110, an upper hinge bracket 112, a lower spine 114, and a lower hinge bracket 116. In another embodiment of the present invention, the adjustable spine 104 may be a single telescopic tube. Further, the adjustable spine 104 may be a collapsible spine that may be designed to be adjusted at multiple heights, such as, fully extended and/or deployed, i.e., a cart mode for transportation, an intermediate position, i.e., a stand mode, for functioning as a stand to hold the instrument 136, and a fully collapsed and/or non-deployed, i.e., a folded mode for storage. In an embodiment of the present invention, the upper spine 110 and the lower spine 114 of the adjustable spine 104 may be telescopic tubes. In another embodiment of the present invention, the upper spine 110 and the lower spine 114 of the adjustable spine 104 may be metal rods that may be extended and/or collapsed by using a hinge mechanism by a user. Further, the metal rods may be hollow rods, according to an embodiment of the present invention. In another embodiment of the present invention, the metal rods may be solid rods.

Further, the upper spine 110, the upper hinge bracket 112, the lower spine 114, and the lower hinge bracket 116 may be made up of a material such as, but not limited to, an aluminum, an iron, a copper, a steel, a plastic, a fiberglass, a wood, and so forth. Embodiments of the present invention are intended to include or otherwise cover any material of the upper spine 110, the upper hinge bracket 112, the lower spine 114, and the lower hinge bracket 116 including known, related art, and/or later developed technologies. Furthermore, the upper spine 110 and the lower spine 114 may be covered using a padding, according to embodiments of the present invention. According to embodiments of the present invention, the padding may be made up of a material, such as, but not limited to, a rubber, an elastomer, a foam, and so forth. Embodiments of the present invention are intended to include or otherwise cover any material for the padding including known, related art, and/or later developed technologies.

The backrest 106 of the mobile foldable instrument stand 100 may be a flat plate attached near a center of the adjustable spine 104, according to embodiments of the present invention. The backrest 106 may provide a support to the instrument 136 held within the mobile foldable instrument stand 100 in the cart mode, according to embodiments of the present invention. Further, the backrest 106 may be made up of a material such as, but not limited to, an aluminum, an iron, a copper, a steel, and so forth. Embodiments of the present invention are intended to include or otherwise cover any material of the backrest 106 including known, related art, and/or later developed technologies.

Figure 2:
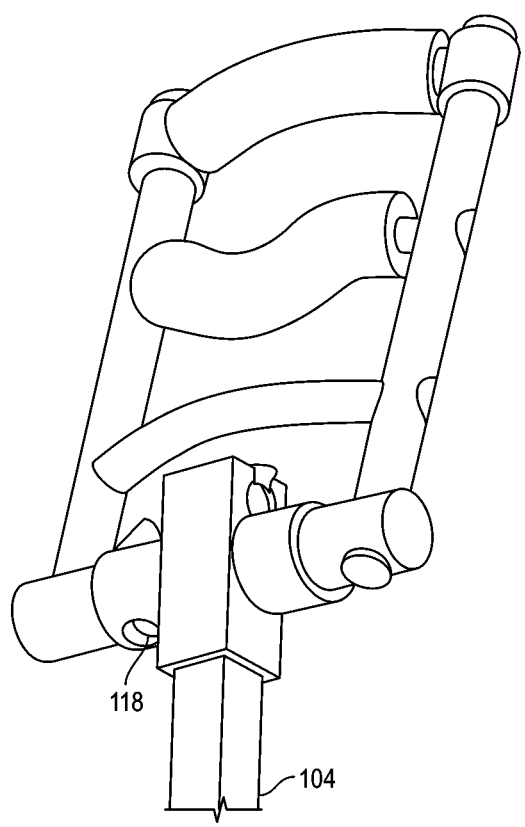
FIG. 2 illustrates a perspective view of a handle of the mobile foldable instrument stand, according to an embodiment of the present invention.

FIG. 2 illustrates a perspective view of the handle 102 of the mobile foldable instrument stand 100, according to an embodiment of the present invention. According to embodiments of the present invention, a rotation of the handle 102 may be controlled using a button 118 disposed on the handle 102. According to embodiments of the present invention, the button 118 may be, but not limited to, a spring button, a tent-pole button, and so forth. Embodiments of the present invention are intended to include or otherwise type of the button 118 including known, related art, and/or later developed technologies that may be beneficial to lock and/or unlock the handle 102 in a particular mode.

According to an embodiment of the present invention, the handle 102 may be rotated by the user to adjust in a particular mode by depressing the button 118. Further, the handle 102 may be rotated in a clockwise direction and/or an anti-clockwise direction until the button 118 snaps into a next hole (not shown) to lock the handle 102 in that particular mode. According to embodiments of the present invention, the handle 102 may be rotated by the user for adjusting the handle 102 in the cart mode, the stand mode, or the folded mode. According to an embodiment of the present invention, the handle 102 may be rotated to an angle of 270 degrees in the clockwise direction from a front side towards a rear side of the mobile foldable instrument stand 100, with respect to the adjustable spine 104 and more specifically, the upper spine 110. According to another embodiment of the present invention, the handle 102 may be rotated to an angle of 270 degrees in the anti-clockwise direction from the rear side towards the front side of the mobile foldable instrument stand 100, with respect to the adjustable spine 104 and more specifically, the upper spine 110. In an embodiment of the present invention, if the handle 102 is snapped into a next hole by rotating in the clockwise direction to an angle of 90 degrees from the stand mode, then the handle 102 may be in the cart mode. In another embodiment of the present invention, if the handle 102 is snapped into a next hole by rotating in the clockwise direction to an angle of 270 degrees from the stand mode, then the handle 102 may be in the folded mode. In yet another embodiment of the present invention, if the handle 102 is snapped into a next hole by rotating in the clockwise direction to an angle of 180 degrees from the cart mode, then the handle 102 may be in the folded mode. In yet another embodiment of the present invention, if the handle 102 is snapped into a next hole by rotating in the anti-clockwise direction to an angle of 180 degrees from the folded mode, then the handle 102 may be in the cart mode. In yet another embodiment of the present invention, if the handle 102 is snapped into a next hole by rotating in the anti-clockwise direction to an angle of 270 degrees from the folded mode, then the handle 102 may be in the stand mode. In yet another embodiment of the present invention, if the handle 102 is snapped into a next hole by rotating in the anti-clockwise direction to an angle of 90 degrees from the cart mode, then the handle 102 may be in the stand mode. Further, the handle 102 in the stand mode may act as a yoke and may be used to hold the instrument 136 in a stationary position such as, the stand mode, according to embodiments of the present invention. According to embodiments of the present invention, the handle 102 in the cart mode (as depicted in the FIG. 1) may be used to pull the mobile foldable instrument stand 100 as a cart, in the cart mode, to transport the instrument 136 from one place to another.

FIG. 3A illustrates a movement of the handle 102 over the adjustable spine 104 of the mobile foldable instrument stand 100, according to embodiments of the present invention. According to embodiments of the present invention, the user of the mobile foldable instrument stand 100 may adjust a height of the handle 102 by using the button 118 (as shown in the FIG. 2), in an embodiment of the present invention. In an embodiment of the present invention, if the button 118 is pressed, the handle 102 may slide down along a length of the adjustable spine 104 to a desired height. In another embodiment of the present invention, if the button 118 is depressed, the handle 102 may snap into a hole to lock the handle 102 at that position. In another embodiment of the present invention, the handle 102 may slide down to a bottom of the upper spine 110 of the adjustable spine 104. Further, the handle 102 may rest on the upper hinge bracket 112 of the adjustable spine 104 that may restrict further movement of the handle 102 over the adjustable spine 104, according to embodiments of the present invention.

FIG. 3B illustrates the instrument 136 held within the yoke of the handle 102, according to an embodiment of the present invention. The handle 102 may comprise a lever 120 that may be flipped to serve as the yoke, such as, a V-shaped prong, to stabilize the instrument 136 when the mobile foldable instrument stand 100 is in the stand mode. According to embodiments of the present invention, the handle 102 may further comprise a concave recess 122 that may be provided to accept a part of the instrument 136. In an embodiment of the present invention, the lever 120 of the handle 102 may be unlatched that may then swing in a vertical orientation. Further, the lever 120 may be unlatched to securely hold the part of the instrument 136 such as, but is not limited to, a headstock of a guitar. Furthermore, the instrument 136 may be placed on the mobile foldable instrument stand 100, the headstock of the guitar may be leaned within the concave recess 122 of the handle 102 and the lever 120 may be latched in a horizontal orientation to hold the instrument 136 securely within the yoke of the handle 102. In another embodiment of the present invention, the yoke of the handle 102 may be designed to accept a case of the instrument 136 in the stand mode.

Further, the handle 102 may be made up of a material such as, but not limited to, an aluminum, an iron, a copper, a steel, a plastic, a fiberglass, a wood, and so forth. Embodiments of the present invention are intended to include or otherwise cover any material of the handle 102 including known, related art, and/or later developed technologies. Furthermore, the handle 102 may be covered using a padding that may provide a cushion to the instrument 136 when the instrument 136 is inserted and held inside the yoke of the handle 102, according to embodiments of the present invention. According to embodiments of the present invention, the padding may be made up of a material, such as, but not limited to, a rubber, an elastomer, a foam, and so forth. Embodiments of the present invention are intended to include or otherwise cover any material for the padding including known, related art, and/or later developed technologies.

Figure 4:
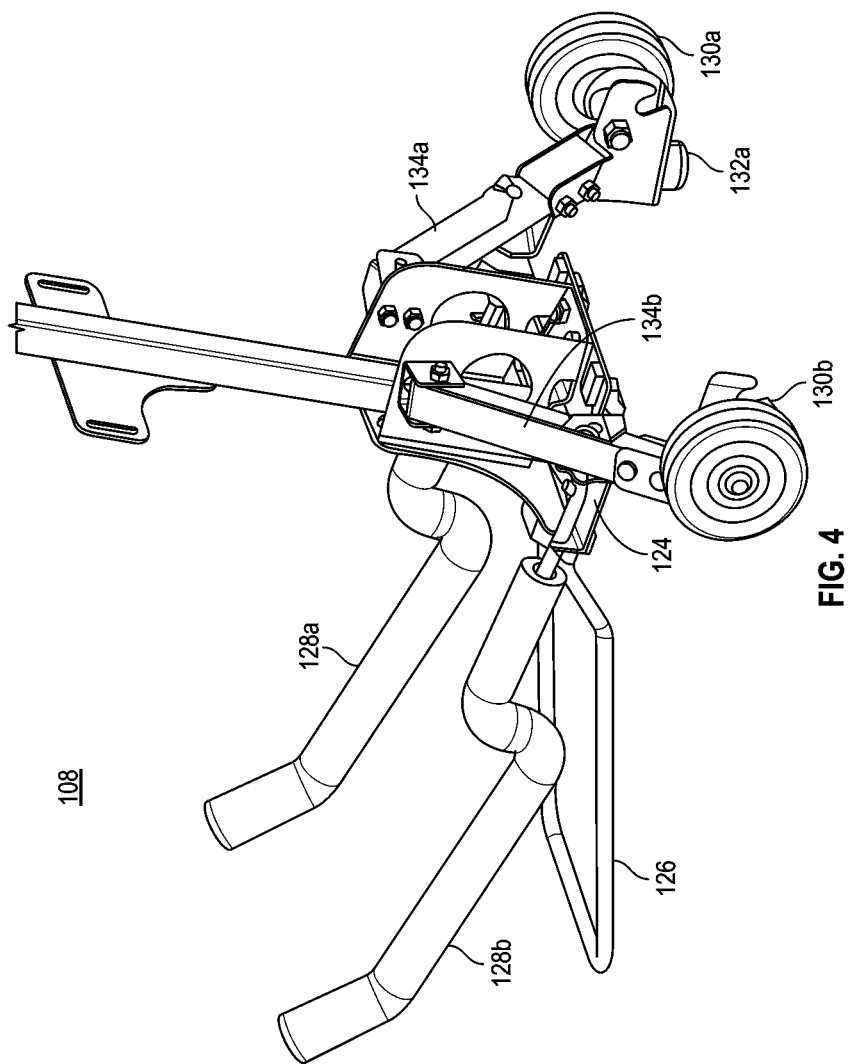
FIG. 4 illustrates an enlarged view of a cradle of the mobile foldable instrument stand, according to an embodiment of the present invention.

FIG. 4 illustrates an enlarged view of the cradle 108 of the mobile foldable instrument stand 100, according to an embodiment of the present invention. The cradle 108 of the mobile foldable instrument stand 100 may comprise a base 124, a front foot 126, a plurality of forks 128a-128b (hereinafter referred to as the forks 128), a plurality of wheels 130a-130b (hereinafter referred to as the wheels 130), and a plurality of bumpers 132a-132b (hereinafter referred to as the bumpers 132).

The base 124 of the mobile foldable instrument stand 100 may be designed to provide a rigid support to the mobile foldable instrument stand 100 and other components of the mobile foldable instrument stand 100 in the stand mode and/or the cart mode, according to embodiments of the present invention. Further, the base 124 may be made up of a material such as, but not limited to, an aluminum, an iron, a copper, a steel, and so forth. Embodiments of the present invention are intended to include or otherwise cover any material of the base 124 including known, related art, and/or later developed technologies.

According to embodiments of the present invention, the front foot 126 may be a hollow tube structure designed to provide a support to the mobile foldable instrument stand 100 in the stand mode. Further, the front foot 126 may be attached to the base 124 through a hinge mechanism, in an embodiment of the present invention. The hinge mechanism may enable the front foot 126 to be rotated in an anti-clockwise direction from the stand mode and/or the cart mode to the folded mode, in an embodiment of the present invention. The hinge mechanism may enable the front foot 126 to be rotated in a clockwise direction from the folded mode to the stand mode and/or the cart mode, in another embodiment of the present invention. Further, the front foot 126 may be made up of a material such as, but not limited to, an aluminum, an iron, a copper, a steel, and so forth. Embodiments of the present invention are intended to include or otherwise cover any material of the front foot 126 including known, related art, and/or later developed technologies.

According to embodiments of the present invention, the forks 128 of the mobile foldable instrument stand 100 may be attached to the base 124 through a hinge mechanism. Further, the forks 128 may be designed to rest over a front end of the base 124 when the mobile foldable instrument stand 100 is in the stand mode and/or the cart mode, according to embodiments of the present invention. In an embodiment of the present invention, the forks 128 may be hollow tubes that may be designed to provide a support to the base of the instrument 136 held within the mobile foldable instrument stand 100. Further, a shape of the forks 128 may be made such that the forks 128 may be able to hold a base of the instrument 136 in a comfortable position, according to embodiments of the present invention. Furthermore, the forks 128 may be made up of a material such as, but not limited to, an aluminum, an iron, a copper, a steel, and so forth. Embodiments of the present invention are intended to include or otherwise cover any material of the forks 128 including known, related art, and/or later developed technologies. According to embodiments of the present invention, the forks 128 may be covered using a padding that may provide a cushion to the base of the instrument 136 when the instrument 136 is inserted and held within the mobile foldable instrument stand 100, according to embodiments of the present invention. According to embodiments of the present invention, the padding may be made up of a material, such as, but not limited to, a rubber, an elastomer, a foam, and so forth. Embodiments of the present invention are intended to include or otherwise cover any material for the padding including known, related art, and/or later developed technologies.

According to embodiments of the present invention, the wheels 130 of the mobile foldable instrument stand 100 may be attached towards a rear side of the base 124 through a plurality of legs 134a-134b (hereinafter referred to as the legs 134). The wheels 130 may be provided to enable a movement of the mobile foldable instrument stand 100 from one place to another. According to embodiments of the present invention, the wheels 130 may be, but not limited to, a disc wheel, a caster wheel, a spinner wheel, and so forth. Embodiments of the present invention are intended to include or otherwise cover any type of the wheels 130 including known, related art, and/or later developed technologies, which may enable a movement of the mobile foldable instrument stand 100.

Further, the bumpers 132 may be provided to support the mobile foldable instrument stand 100 in a stable position in the stand mode. In an embodiment of the present invention, the bumpers 132 may be attached near the wheels 130. The bumpers 132 may be designed to provide a cushion to the mobile foldable instrument stand 100 in the stand mode, according to an embodiment of the present invention. According to embodiments of the present invention, the bumpers 132 may be made up of a material such as, but not limited to, a rubber, a plastic, and so forth. Embodiments of the present invention are intended to include or otherwise cover any type of the material for the bumpers 132 including known, related art, and/or later developed technologies. In an embodiment of the present invention, the mobile foldable instrument stand 100 may convert from the stand mode to the cart mode only if the mobile foldable instrument stand 100 is significantly leaned over so that the wheels 130 make contact with a ground surface, and the front foot 126 and the bumpers 132 move above the ground surface.

Figure 5A:
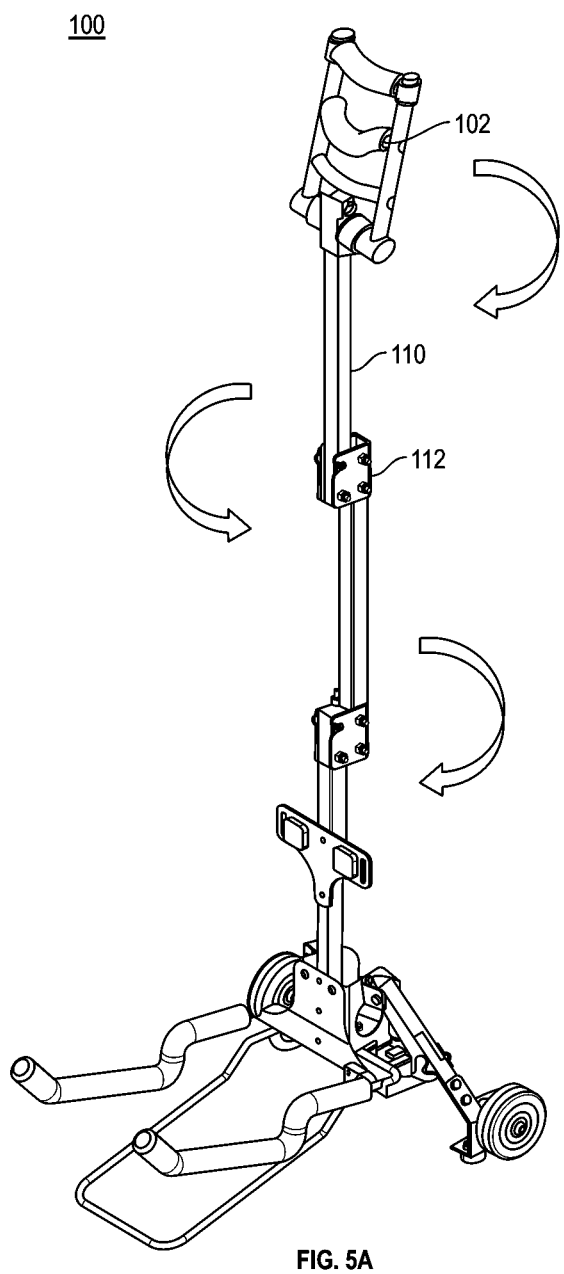
FIGS. 5A-5G illustrate a step-by-step folding of the mobile foldable instrument stand from a stand mode to a folded mode, according to an embodiment of the present invention.

FIGS. 5A-5G illustrate a step-by-step folding of the mobile foldable instrument stand 100 from the stand mode to the folded mode, according to an embodiment of the present invention. FIG. 5A illustrates the mobile foldable instrument stand 100 in the stand mode. Further, to rotate the handle 102 of the mobile foldable instrument stand 100 in the folded mode, the handle 102 may be rotated, for example, in the clockwise direction to an angle of 180 degrees, and snapped into a position by using the button 118 (as shown in the FIG. 2). In an embodiment of the present invention, the button 118 may be the spring button or the tent-pole button, as discussed above.

Figure 5B:
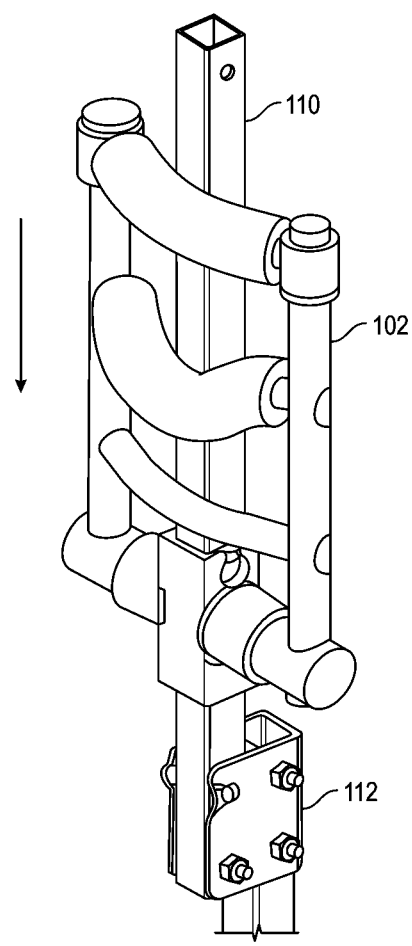

FIG. 5B illustrates an enlarged view of the handle 102 in the folded mode, according to embodiments of the present invention. According to embodiments of the present invention, the handle 102 may be slide down through the upper spine 110 to the upper hinge bracket 112. Further, the upper spine 110 may be rotated in the anti-clockwise direction through the upper hinge bracket 112 towards the front side of the mobile foldable instrument stand 100.

Figure 5C:
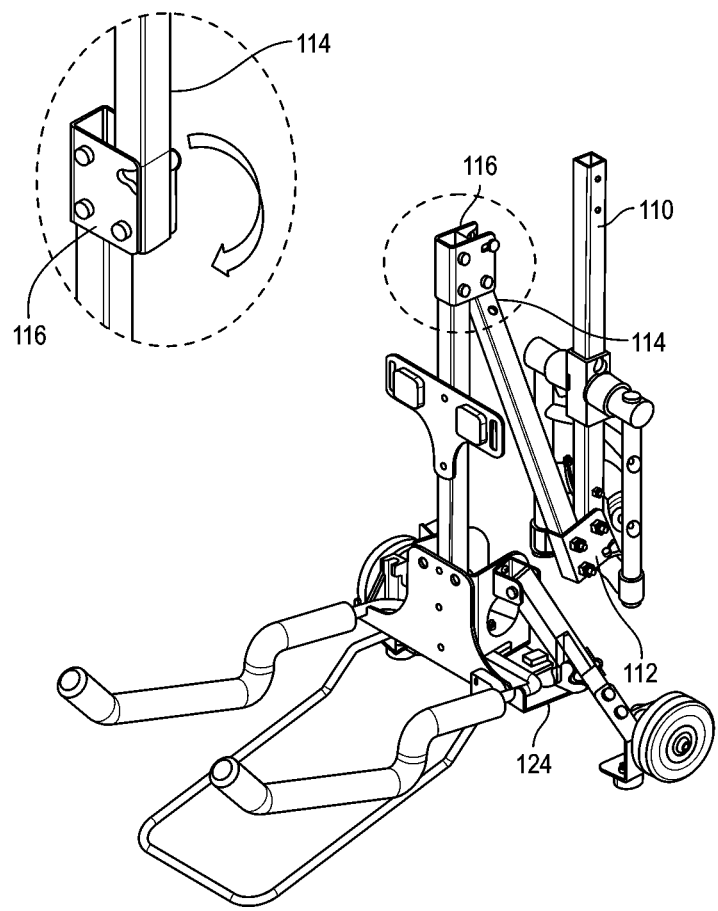

FIG. 5C illustrates the folded lower spine 114, according to embodiments of the present invention. In an embodiment of the present invention, the upper spine 110 and the lower spine 114 may be attached through the upper hinge bracket 112 through a hinge mechanism having nuts and bolts. Further, the lower spine 114 may be folded by rotating the lower spine 114 in the clockwise direction towards a rear side of the base 124 through the lower hinge bracket 116. In another embodiment of the present invention, the upper spine 110 and lower spine 114 may comprise collapsible telescopic tubing.

Figure 5D:
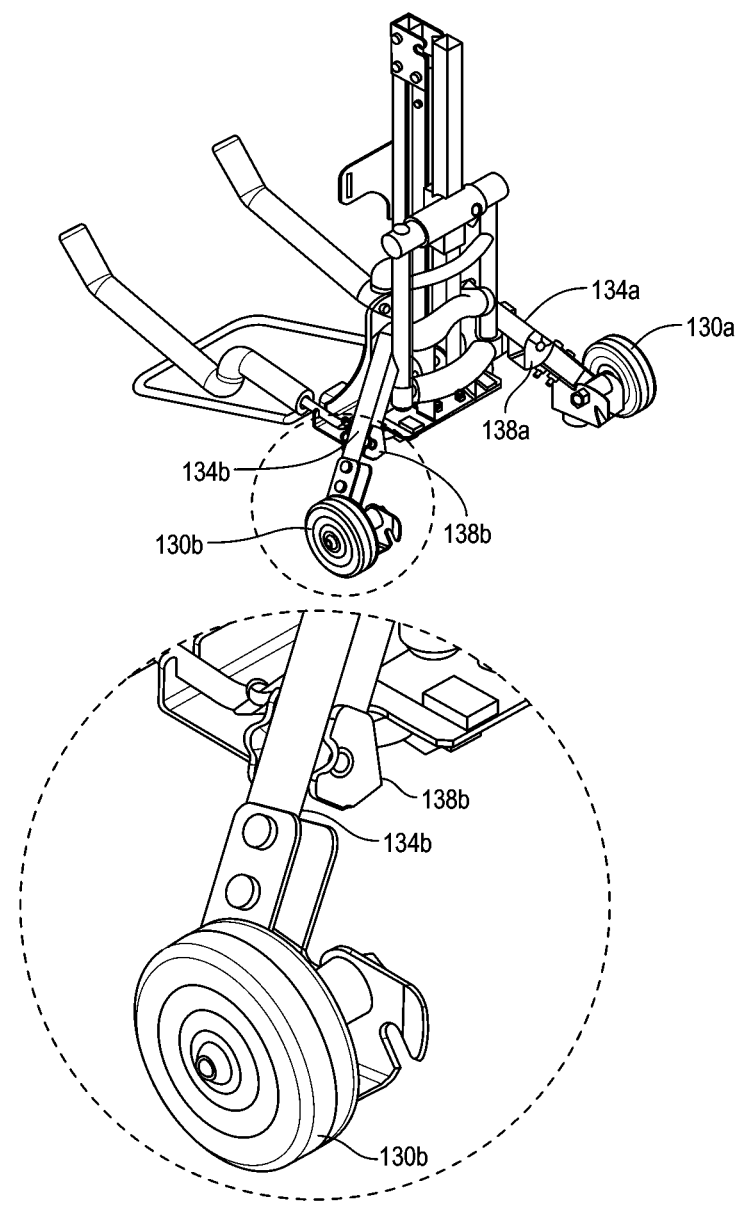

FIG. 5D illustrates an enlarged view of the folded legs 134 of the mobile foldable instrument stand 100, according to embodiments of the present invention. The legs 134 and the wheels 130 may be connected to each other through a plurality of brackets 138a-138b (hereinafter referred to as the brackets 138), according to embodiments of the present invention. The legs 134 may be unsnapped from the brackets 138 by using a button (not shown) such as, the spring button or the tent-pole buttons and the legs 134 may be folded at the rear side of the mobile foldable instrument stand 100. Further, the wheels 130 may also be pushed inside towards the legs 134 to be in the folded mode, according to embodiments of the present invention.

Figure 5E:
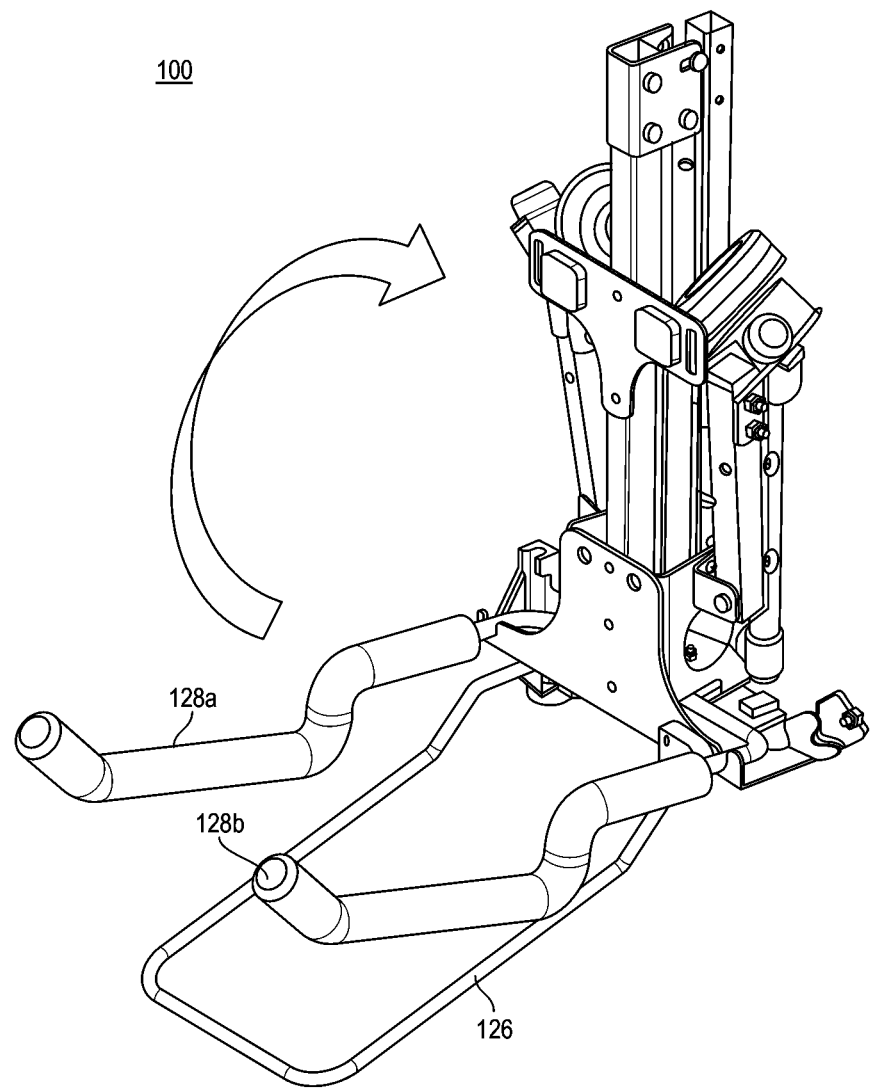

FIG. 5E illustrates a movement of the forks 128 in the folded mode, according to embodiments of the present invention. According to embodiment of the present invention, the fork 128 may be rotated in the clockwise direction towards the folded upper spine 110 and the lower spine 114 in the folded mode.

Figure 5F:
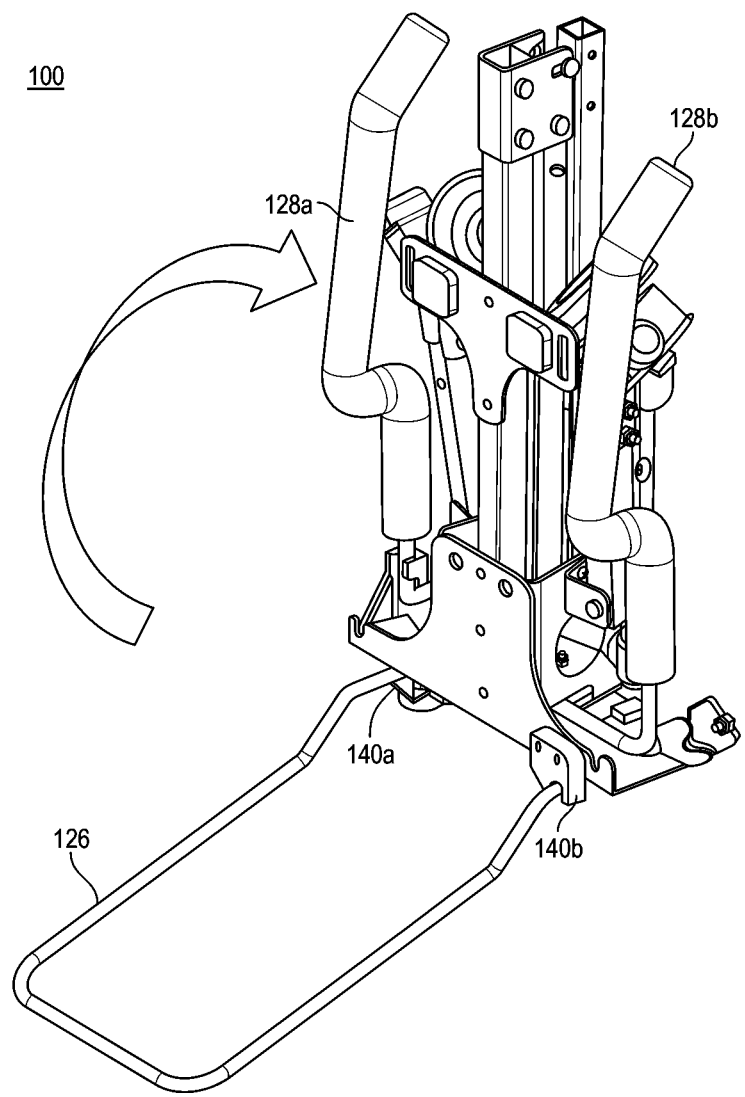

FIG. 5F illustrates a movement of the front foot 126 in the folded mode, according to embodiments of the present invention. According to embodiment of the present invention, the front foot 126 may be rotated in the anti-clockwise direction towards the folded upper spine 110 and the lower spine 114 by disengaging a plurality of snap detent 140a-140b (hereinafter referred to as the snap detent 140). According to embodiments of the present invention, the snap detent 140 may be provided to restrict the rotation of the front foot 126 when the mobile foldable instrument stand 100 is in the stand mode and/or the cart mode. According to another embodiment of the present invention, the front foot 126 may be rotated in the clockwise direction towards the backrest 106 by disengaging the snap detent 140.

Figure 5G:
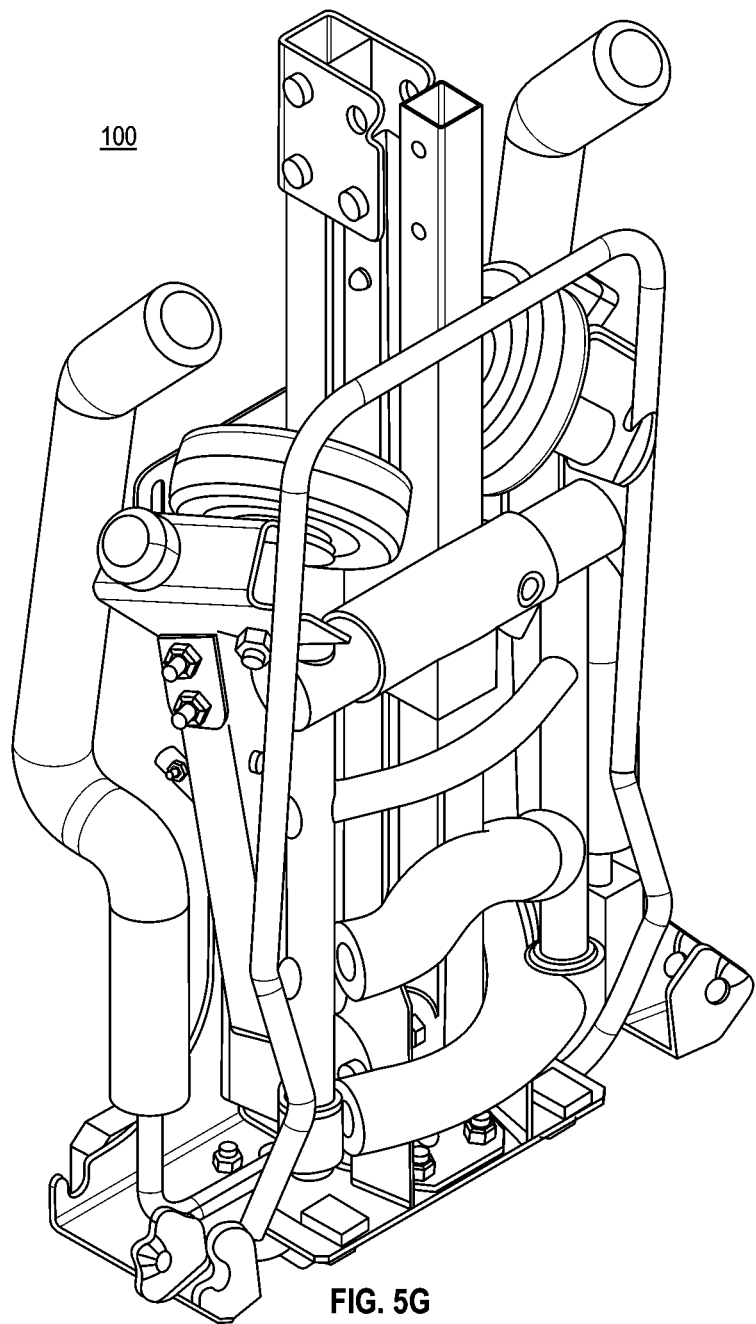

FIG. 5G illustrates the mobile foldable instrument stand 100 in the folded mode, according to embodiments of the present invention. According to embodiments of the present invention, the folded mode may be beneficial for storage of the mobile foldable instrument stand 100. In another embodiment of the present invention, the folded mode may be beneficial for easy carrying of the mobile foldable instrument stand 100 into a backpack, or a gig bag. The mobile foldable instrument stand 100 may also be converted from the cart mode to the folded mode in a similar manner as discussed above after the instrument 136 is removed from the mobile foldable instrument stand 100. Further, in order to deploy the mobile foldable instrument stand 100 from the folded mode to the stand mode and/or the cart mode, the above discussed procedure may be reversed, in an embodiment of the present invention.

FIG. 6 illustrates the mobile foldable instrument stand 100 in the stand mode holding the instrument 136 having an instrument case, according to an embodiment of the present invention. The instrument or the instrument case (collectively referred to as "the instrument") 136 may be placed on the fork 128 of the mobile foldable instrument stand 100, which may be provided to support the instrument 136. The instrument 136 may be secured to the mobile foldable instrument stand 100 by using a securing means such as, a bungee cord 142, in an embodiment of the present invention. The bungee cord 142 may securely tie the instrument 136 to the mobile foldable instrument stand 100 for use in both the stand mode and the cart mode.

In an embodiment of the present invention, the mobile foldable instrument stand 100 may be designed to fit all shapes and sizes of the instrument 136, including, but not limited to, an acoustic guitar, an electric guitar, a bass guitar, and so forth. The mobile foldable instrument stand 100 may be pulled by the user and folded and/or collapsed small enough to be stored into a luggage carry-on. In another embodiment of the present invention, the mobile foldable instrument stand 100 may be folded up to approximately 16 inches in height in the folded mode.

Figure 7A:
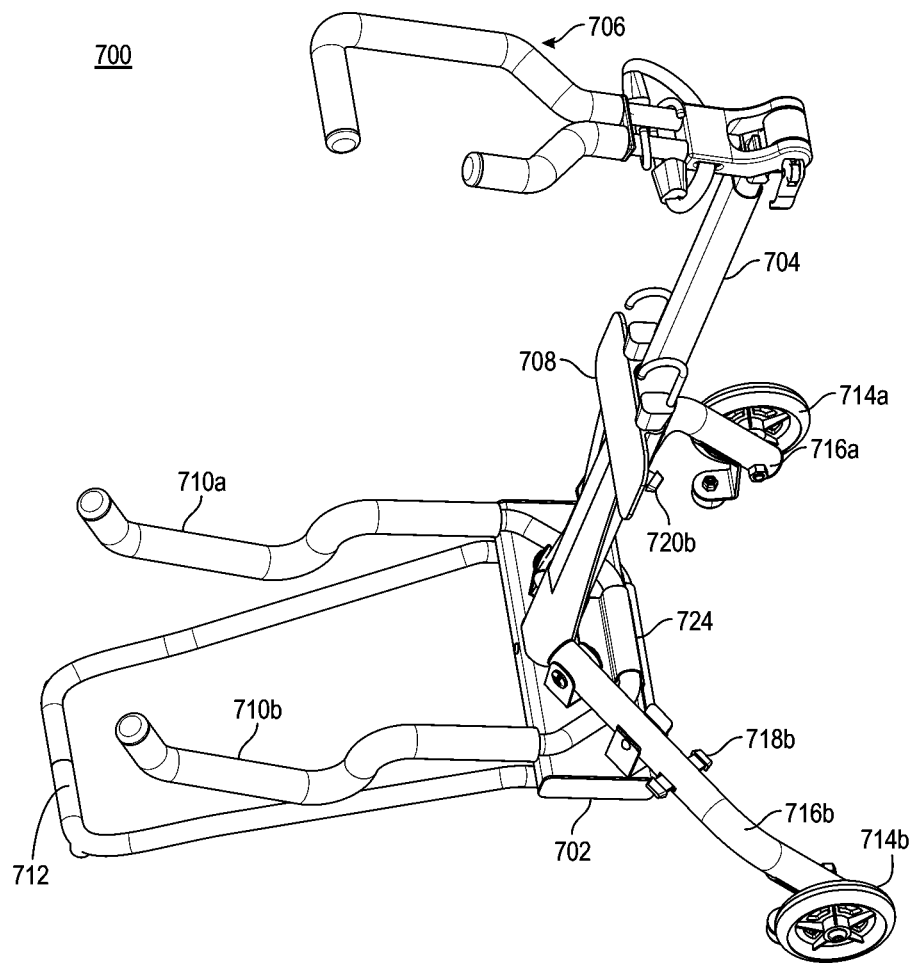
FIG. 7A illustrates an overhead view of a mobile foldable instrument stand in a stand mode, according to another embodiment of the present invention.

FIG. 7A illustrates an overhead view of a mobile foldable instrument stand 700 in a stand mode, according to another embodiment of the present invention. The mobile foldable instrument stand 700 comprises a base 702, a telescopic spine 704, a handle 706, a backrest 708, and a plurality of forks 710*a*-710*b* (hereinafter referred to as the forks 710).

The base 702 may be designed to provide a rigid support to the mobile foldable instrument stand 700 and other components of the mobile foldable instrument stand 700 in the stand mode, according to embodiments of the present invention. Further, the base 702 may be made up of a material such as, but not limited to, an aluminum, an iron, a copper, a steel, and so forth. Embodiments of the present invention are intended to include or otherwise cover any material of the base 702 including known, related art, and/or later developed technologies. According to an embodiment of the present invention, the base 702 may further comprises a front foot 712 attached to the base 702 through a hinge mechanism. The hinge mechanism may enable the front foot 712 to be converted from the stand mode and/or the cart mode to the folded mode by rotating the front foot 712 in an anti-clockwise direction towards a rear side of the telescopic spine 104, in an embodiment of the present invention. Further, the hinge mechanism may enable the front foot 712 to be converted from the folded mode to the stand mode and/or the cart mode by rotating the front foot 712 in a clockwise direction towards a ground surface from the rear side of the telescopic spine 104, in an embodiment of the present invention. The front foot 712 may be a hollow tube structure designed to provide a support to the mobile foldable instrument stand 700 in the stand mode, according to an embodiment of the present invention. According to embodiments of the present invention, the front foot 712 may be made up of a material such as, but not limited to, an aluminum, an iron, a copper, a steel, and so forth. Embodiments of the present invention are intended to include or otherwise cover any material of the front foot 712 including known, related art, and/or later developed technologies.

According to embodiments of the present invention, the base 702 may further comprise a plurality of wheels 714*a*-714*b* (hereinafter referred to as the wheels 714) attached towards a rear end of the base 702 through a plurality of legs 716*a*-716*b* (hereinafter referred to as the legs 716). Further, the legs 716 may be connected to the base 702 by using a hinge mechanism that may enable the legs 716 to be converted from the stand mode and/or the cart mode to the folded mode for storage by rotating the legs 716 in an anti-clockwise direction towards the telescopic spine 704, according to embodiments of the present invention. According to another embodiment of the present invention, the hinge mechanism may enable the legs 716 to be converted from the folded mode to the stand mode and/or the cart mode by rotating the legs 716 in a clockwise direction towards the ground surface. According to embodiments of the present invention, the legs 716 may comprise a plurality of release buttons 718*a*-718*b* (hereinafter referred to as the release buttons 718) that may be provided to control the rotation of the legs 716. The legs 716 may be rotated by pressing the release buttons 718 towards each other that may release the legs 716 and enable the rotation of the legs 716 towards the telescopic spine 704 in the folded mode from the stand mode and/or the cart mode, according to an embodiment of the present invention. According to another embodiment of the present invention, the legs 716 may be rotated by pressing the release buttons 718 towards each other that may release the legs 716 and enable the rotation of the legs 716 towards the ground surface in the stand mode and/or the cart mode from the folded mode.

According to embodiments of the present invention, the wheels 714 may be provided to enable a movement of the mobile foldable instrument stand 700 from one place to another. According to embodiments of the present invention, the wheels 714 may be, but not limited to, a disc wheel, a caster wheel, a spinner wheel, and so forth. Embodiments of the present invention are intended to include or otherwise cover any type of the wheels 714 including known, related art, and/or later developed technologies.

The telescopic spine 704 may be provided for adjusting a height of the mobile foldable instrument stand 700, according to embodiments of the present invention. The telescopic spine 704 may comprise a plurality of concentric tubes that may enable a user of the mobile foldable instrument stand 700 to increase and/or decrease the height of the telescopic spine 704 by pulling and/or pushing the handle 706 along a vertical axis of the mobile foldable instrument stand 700, according to embodiments of the present invention. Further, the height of the mobile foldable instrument stand 700 may be adjusted through the telescopic spine 704 according to a mode selected by the user, in an embodiment of the present invention. According to embodiments of the present invention, the mode may be, but not limited to, the stand mode, the folded mode, or the cart mode, as discussed above. Further, the telescopic spine 704 may be made up of a material such as, but not limited to, an aluminum, an iron, a copper, a steel, and so forth. Embodiments of the present invention are intended to include or otherwise cover any material of the telescopic spine 704 including known, related art, and/or later developed technologies. According to embodiments of the present invention, the handle 706 of the mobile foldable instrument stand 700 may be provided to be used as a yoke for holding an instrument 738 (as shown in FIG. 7D) when the mobile foldable instrument stand 700 is in the stand mode. Further, the handle 706 is explained in detail in conjunction with FIG. 7B.

The backrest 708 may be a flat plate attached near a center of the telescopic spine 704, according to embodiments of the present invention. The backrest 708 may provide a support to the instrument 738 held within the mobile foldable instrument stand 700 in the cart mode, according to embodiments of the present invention. Further, the backrest 708 may be made up of a material such as, but not limited to, an aluminum, an iron, a copper, a steel, and so forth. Embodiments of the present invention are intended to include or otherwise cover any material of the backrest 708 including known, related art, and/or later developed technologies. Furthermore, a distal end of the backrest 708 may comprise a plurality of guide holes 720a-720b (hereinafter referred to as the guide holes 720) for accepting a plurality of lower bungee cords 722a-722b (as shown in FIG. 7F), according to embodiments of the present invention.

According to embodiments of the present invention, the forks 710 may be attached to the base 702 through a hollow connector 724. The hollow connector 724 may be designed to accept the forks 710 in a freely rotatable configuration. Further, the forks 710 may be designed to rest over a proximal end of the base 702 when the mobile foldable instrument stand 700 is in the stand mode and/or the cart mode, according to embodiments of the present invention. In an embodiment of the present invention, the forks 710 may be hollow tubes that may be designed to provide a support to a base of the instrument 738 held within the mobile foldable instrument stand 700. Further, a shape of the forks 710 may be made such that the forks 710 may be able to hold a base of the instrument 738 in a comfortable position, according to embodiments of the present invention. Furthermore, the forks 710 may be made up of a material such as, but not limited to, an aluminum, an iron, a copper, a steel, and so forth. Embodiments of the present invention are intended to include or otherwise cover any material of the forks 710 including known, related art, and/or later developed technologies. Further, the forks 710 may be covered using a padding that may provide a cushion to the base of the instrument 738 when the instrument 738 is inserted and held within the mobile foldable instrument stand 700, according to embodiments of the present invention. According to embodiments of the present invention, the padding may be made up of a material, such as, but not limited to, a rubber, an elastomer, a foam, and so forth. Embodiments of the present invention are intended to include or otherwise cover any material for the padding including known, related art, and/or later developed technologies.

Figure 7B:
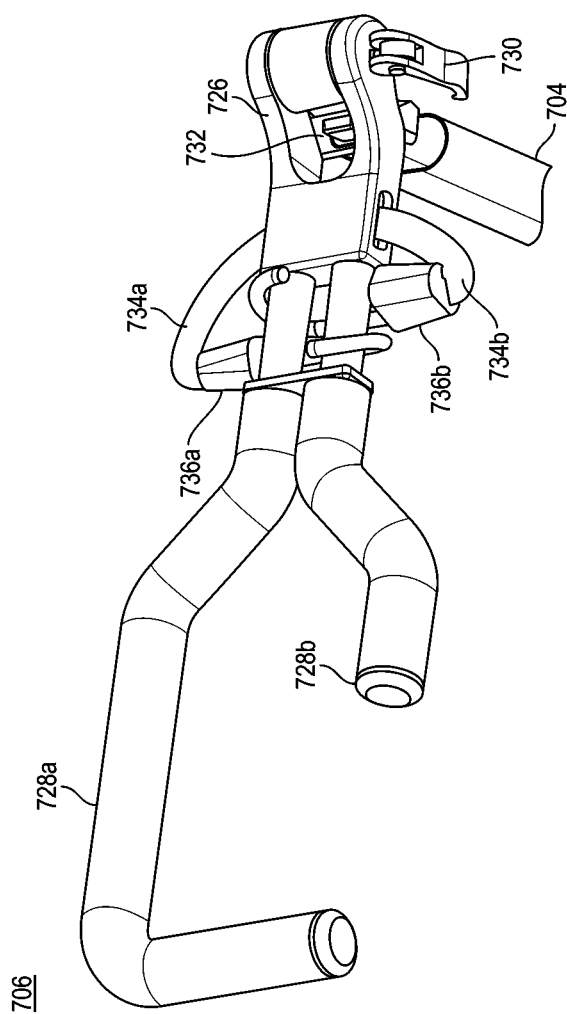
FIG. 7B illustrates an enlarged view of a handle of the mobile foldable instrument stand in the stand mode, according to another embodiment of the present invention.

FIG. 7B illustrates an enlarged view of the handle 706 of the mobile foldable instrument stand 700 in the stand mode, according to another embodiment of the present invention. The handle 706 may be attached to a proximal end of the telescopic spine 704 through a connector 726, according to an embodiment of the present invention. The handle 706 may comprise a plurality of hollow tubes 728a-728b (hereinafter referred to the hollow tubes 728). The hollow tubes 728 may be designed to form a yoke of the mobile foldable instrument stand 700 for securely holding the instrument 738, according to embodiments of the present invention. Further, the hollow tubes 728 may be made up of a material such as, but not limited to, an aluminum, an iron, a copper, a steel, and so forth. Embodiments of the present invention are intended to include or otherwise cover any material of the hollow tubes 728 including known, related art, and/or later developed technologies. Furthermore, the hollow tubes 728 may be covered using the padding that may provide a cushion to the instrument 738 when the instrument 738 is inserted and held inside the yoke, according to embodiments of the present invention. According to embodiments of the present invention, the padding may be made up of a material, such as, but not limited to, a rubber, an elastomer, a foam, and so forth. Embodiments of the present invention are intended to include or otherwise cover any material for the padding including known, related art, and/or later developed technologies.

According to embodiments of the present invention, the connector 726 may comprise a hinge mechanism that may be provided to enable a rotation of the handle 706 in a clockwise direction and/or an anti-clockwise direction. Further, the hinge mechanism of the connector 726 may be operated using a cam lever lock 730. The cam lever lock 730 may be connected to the connector 726 for controlling the rotation of the handle 706 in the clockwise direction and/or the anti-clockwise direction, according to embodiments of the present invention. In an embodiment of the present invention, the cam lever lock 730 may be pushed down to lock the handle 706 in a fixed position. In another embodiment of the present invention, the cam lever lock 730 may be pulled up to release the handle 706 and enable the rotation of the handle 706 in the clockwise direction and/or the anti-clockwise direction. According to embodiments of the present invention, the handle 706 may further comprise a button 732 that may be provided to control a movement of the telescopic spine 704 in an upward and/or a downward direction for increasing and/or decreasing the height of the telescopic spine 704. The button 732 may be, but not limited to, a spring button, a tent-pole button, a push button, a rocker switch, a float switch, and so forth. Embodiments of the present invention are intended to include or otherwise cover type of the button 732 including known, related art, and/or later developed technologies. Further, the handle 706 may be used by the user of the mobile foldable instrument stand 700 to increase and/or decrease the height of the telescopic spine 704 by pulling and/or pushing the handle 706 along a vertical axis of the mobile foldable instrument stand 700, according to embodiments of the present invention.

According to embodiments of the present invention, the hollow tubes 728 of the handle 706 may further comprise a plurality of upper bungee cords 734a-734b that may be provided for securely holding the instrument 738 within the mobile foldable instrument stand 700 in the stand mode and/or the cart mode. Further, each of the upper bungee cords 734a-734b may comprise a first end and a second end, according to embodiments of the present invention. The first end of each of the upper bungee cords 734a-734b may be anchored within the hollow tubes 728 of the handle 706, in an embodiment of the present invention. In an embodiment of the present invention, the second end of the upper bungee cords 734a may comprise a hook 736a and the second end of the upper bungee cords 734b may comprise a hook 736b. The hook 736a-736b may be designed to engage with the hollow tubes 728 of the handle 706 near the connector 726 when the mobile foldable instrument stand 700 is in the stand mode, and/or the folded mode, according to embodiments of the present invention.

According to embodiments of the present invention, the connector 726 of the handle 706 may enable the user to rotate the handle 706 for adjusting the handle 706 in one of the cart mode, the stand mode, or the folded mode. According to an embodiment of the present invention, the handle 706 may be rotated to an angle of 270 degrees in the clockwise direction. According to another embodiment of the present invention, the handle 706 may be rotated to an angle of 270 degrees in the anti-clockwise direction. In an embodiment of the present invention, if the handle 706 is rotated in the clockwise direction to an angle of 90 degrees from the stand mode, then the handle 706 may be in the cart mode. In another embodiment of the present invention, if the handle 706 is rotated in the clockwise direction to an angle of 270 degrees from the stand mode, then the handle 706 may be in the folded mode. In yet another embodiment of the present invention, if the handle 706 is rotated in the clockwise direction to an angle of 180 degrees from the cart mode, then the handle 706 may be in the folded mode. In yet another embodiment of the present invention, if the handle 706 is rotated in the anti-clockwise direction to an angle of 180 degrees from the folded mode, then the handle 706 may be in the cart mode. In yet another embodiment of the present invention, if the handle 706 is rotated in the anti-clockwise direction to an angle of 270 degrees from the folded mode, then the handle 706 may be in the stand mode. In yet another embodiment of the present invention, if the handle 706 is rotated in the anti-clockwise direction to an angle of 90 degrees from the cart mode, then the handle 706 may be in the stand mode.

Figure 7C:
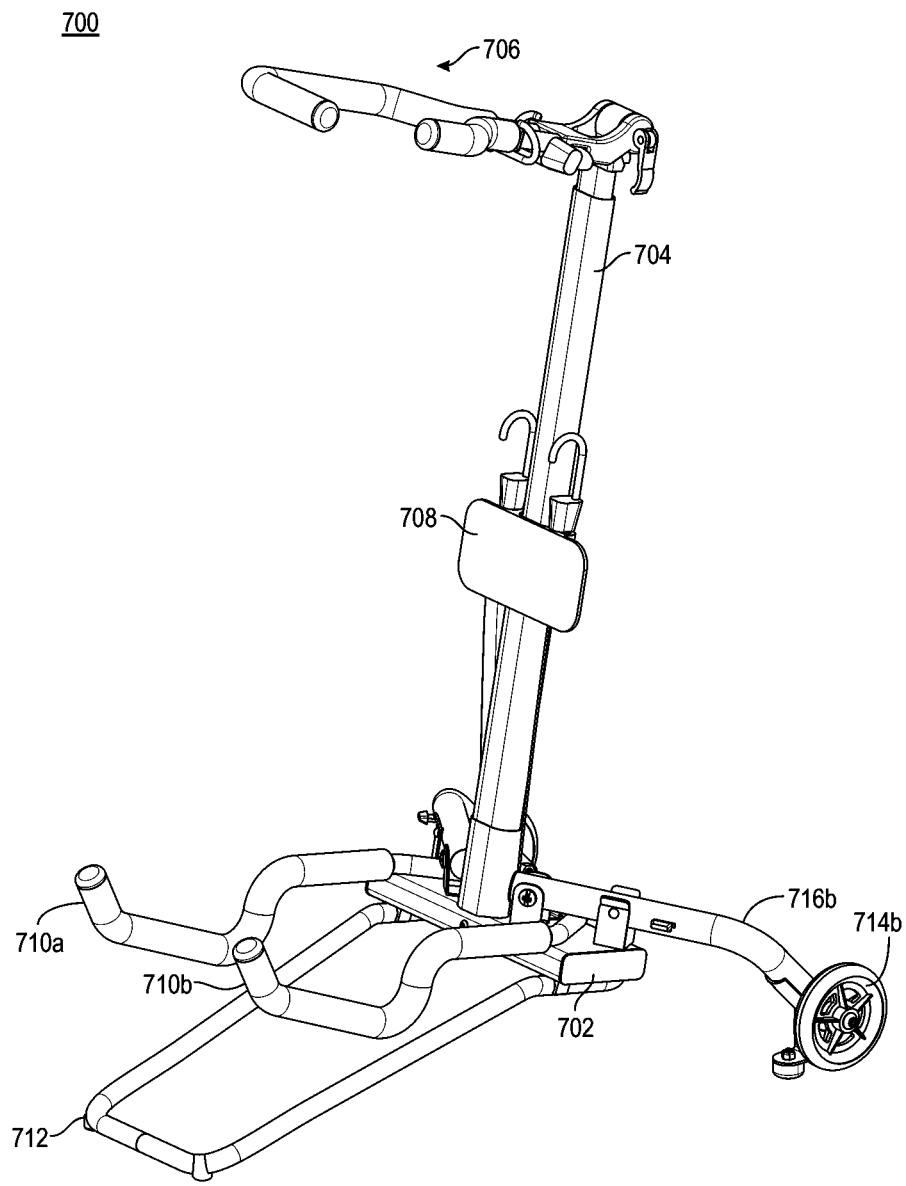
FIG. 7C illustrates a right side perspective view of the mobile foldable instrument stand in the stand mode, according to another embodiment of the present invention.
Figure 7D:
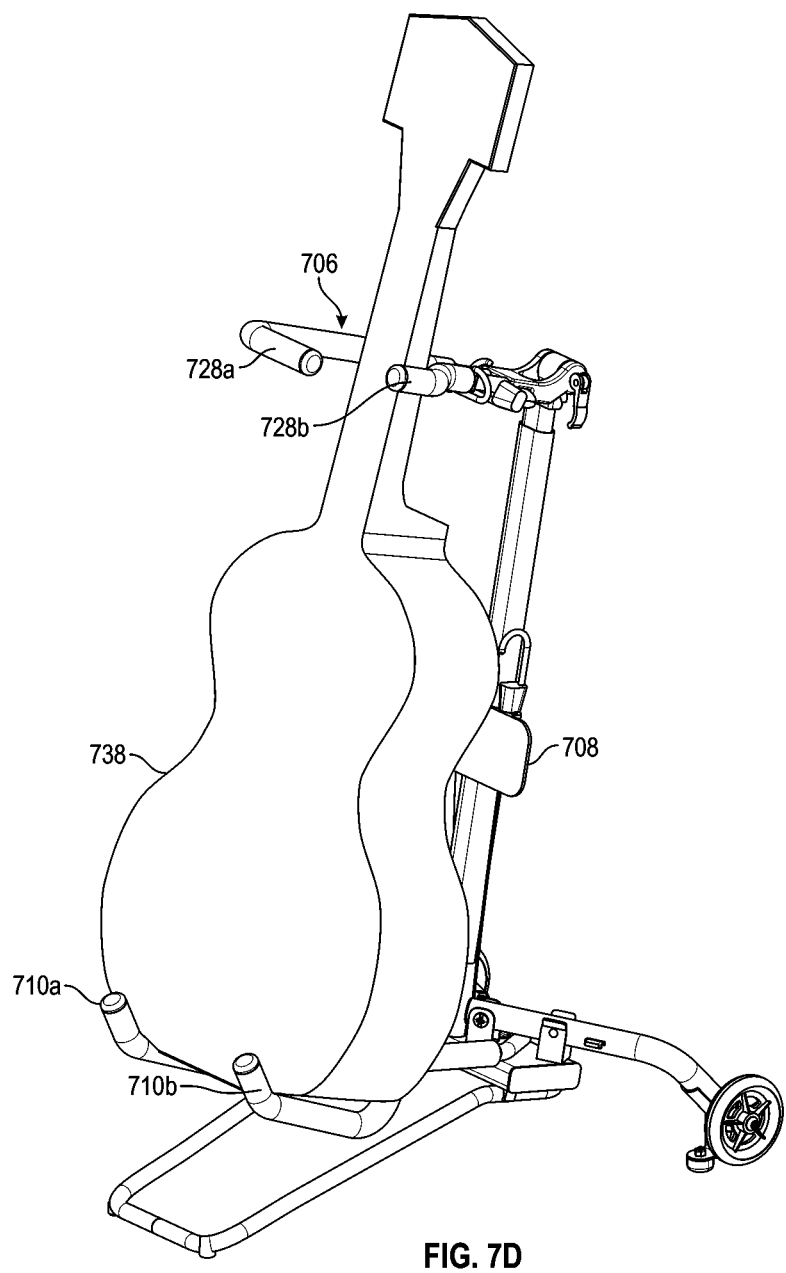
FIG. 7D illustrates a right side perspective view of the mobile foldable instrument stand holding an instrument in the stand mode, according to another embodiment of the present invention.

FIG. 7C illustrates a right side perspective view of the mobile foldable instrument stand 700 in the stand mode, according to another embodiment of the present invention. The mobile foldable instrument stand 700 comprises the base 702, the telescopic spine 704, the handle 706, the backrest 708, and the forks 710. The base 702 may be designed to provide a rigid support to the mobile foldable instrument stand 700 and other components of the mobile foldable instrument stand 700 in the stand mode, according to embodiments of the present invention. According to embodiments of the present invention, the base 702 may further comprise the front foot 712 attached to the base 702 through the hinge mechanism. The hinge mechanism may enable the front foot 712 to be converted from the stand mode and/or the cart mode to the folded mode by rotating the front foot 712 in the anti-clockwise direction towards the rear side of the telescopic spine 704, in an embodiment of the present invention. In another embodiment of the present invention, the hinge mechanism may enable the front foot 712 to be converted from the folded mode to the stand mode and/or the cart mode by rotating the front foot 712 in the clockwise direction towards the ground surface in the stand mode and/or the cart mode. According to embodiments of the present invention, the base 702 may further comprise the wheels 714 attached towards the rear end of the base 702 through the legs 716, as discussed above. Further, the legs 716 may be connected to the base 702 using the hinge mechanism that may enable the legs 716 to be converted from the stand mode and/or the cart mode to the folded mode by rotating the legs 716 in the anti-clockwise direction towards the telescopic spine 704, according to an embodiment of the present invention. According to another embodiment of the present invention, the hinge mechanism may enable the legs 716 to be converted from the folded mode to the stand mode and/or the cart mode by rotating the legs 716 in the clockwise direction towards the ground surface in the stand mode and/or the cart mode.

The telescopic spine 704 may be provided for adjusting the height of the mobile foldable instrument stand 700, according to embodiments of the present invention. The telescopic spine 704 may comprise the plurality of concentric rods that may enable the user of the mobile foldable instrument stand 700 to increase and/or decrease the height of the telescopic spine 704 by pulling and/or pushing the handle 706 along the vertical axis of the mobile foldable instrument stand 700, according to embodiments of the present invention. The telescopic spine 704 may be adjusted in one of, the stand mode, the cart mode, or the folded mode, according to embodiments of the present invention. In an embodiment of the present invention, if the telescopic spine 704 is fully extended by the user by pulling the handle 706 along the vertical axis of the mobile foldable instrument stand 700, then the telescopic spine 704 may be in the cart mode. Further, if the telescopic spine 704 is extended and/or collapsed by the user to an intermediate position, then the telescopic spine 704 may be in the stand mode. Furthermore, if the telescopic spine 704 is fully collapsed by the user by pushing the handle 706 along the vertical axis of the mobile foldable instrument stand 700, then the telescopic spine 704 may be in the folded mode.

The backrest 708 of the mobile foldable instrument stand 700 may be the flat plate attached near the center of the telescopic spine 704, according to embodiments of the present invention. The backrest 708 may provide the support to the instrument 738 held within the mobile foldable instrument stand 700 in the stand mode and/or the cart mode, according to embodiments of the present invention. According to embodiments of the present invention, the forks 710 of the mobile foldable instrument stand 700 may be attached to the base 702 through the hollow connector 724 (as shown in the FIG. 7A). Further, the forks 710 may be designed to rest over the front end of the base 702 when the mobile foldable instrument stand 700 is in the stand mode and/or the cart mode, according to embodiments of the present invention.

FIG. 7D illustrates a right side perspective view of the mobile foldable instrument stand 700 holding the instrument 738 in the stand mode, according to another embodiment of the present invention. The handle 706 may comprise the hollow tubes 728 that may be designed to form the yoke of the mobile foldable instrument stand 700 for securely holding the instrument 738, according to embodiments of the present invention. Further, the hollow tubes 728 may be covered using the padding that may provide the cushion to the instrument 738, when the instrument 738 is inserted and held within the yoke, according to embodiments of the present invention. In an embodiment of the present invention, the forks 710 may be hollow tubes that may be designed to provide the support to a base of the instrument 738 held within the mobile foldable instrument stand 700. Further, the shape of the forks 710 may be made such that the forks 710 may be able to hold the base of the instrument 738 in a comfortable position, according to embodiments of the present invention. Furthermore, the forks 710 may be covered using a padding that may provide a cushion to the base of the instrument 738 when the instrument is inserted and held within the mobile foldable instrument stand 700, according to embodiments of the present invention. According to embodiments of the present invention, the backrest 708 of the mobile foldable instrument stand 700 may provide the support to the instrument 738 held within the mobile foldable instrument stand 700 in the cart mode, according to embodiments of the present invention.

Figure 7E:
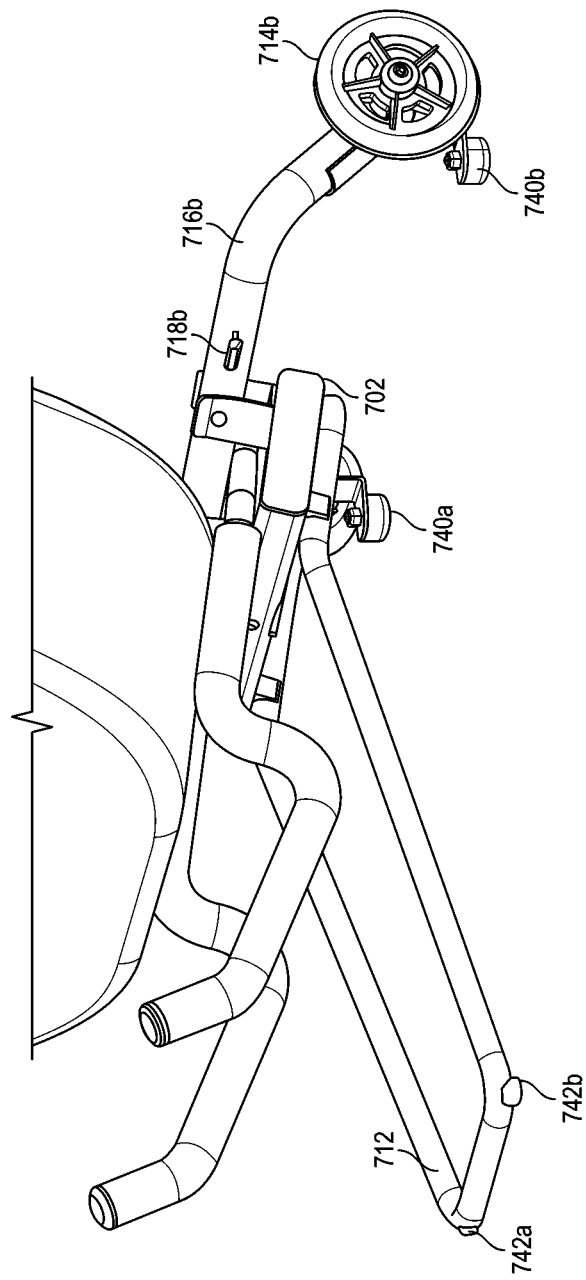
FIG. 7E illustrates an enlarged partial view of the mobile foldable instrument stand, according to another embodiment of the present invention.
Figure 7F:
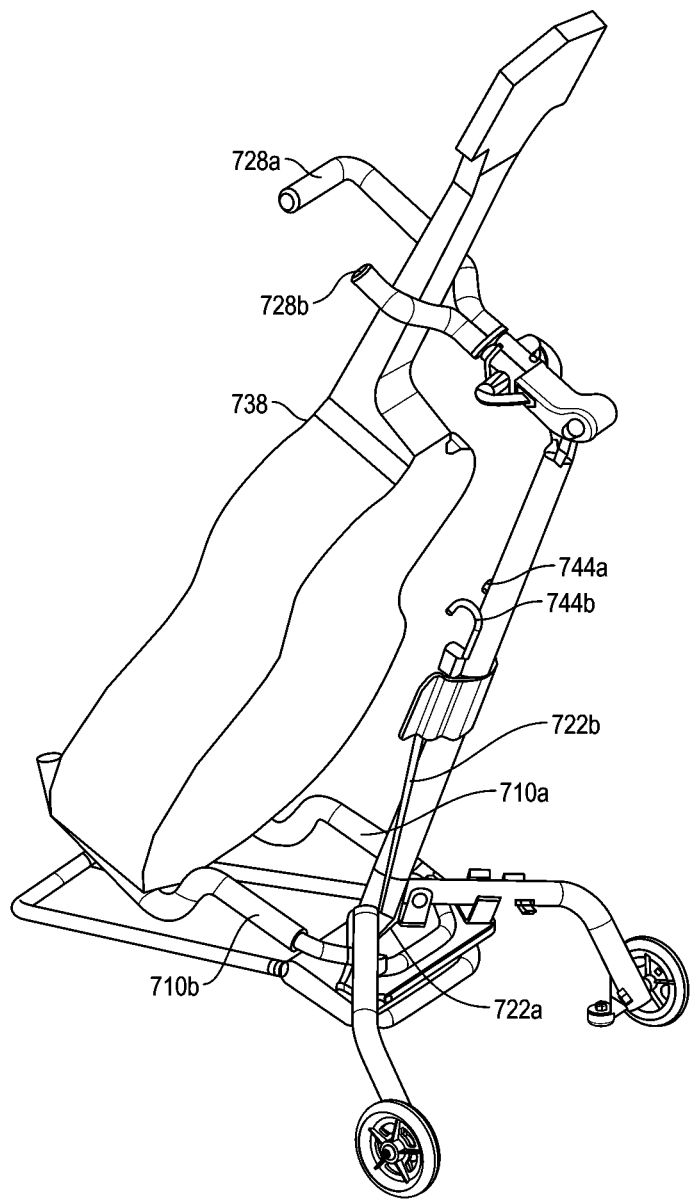
FIG. 7F illustrates a rear perspective view of the mobile foldable instrument stand holding the instrument in the stand mode, according to another embodiment of the present invention

FIG. 7E illustrates an enlarged partial view of the mobile foldable instrument stand 700, according to another embodiment of the present invention. The base 702 may comprise the wheels 714 attached towards the rear end of the base 702 through the legs 716. Further, the legs 716 may be connected to the base 702 using the hinge mechanism that may enable the legs 716 to be converted from the stand mode and/or the cart mode to the folded mode by rotating the legs 716 in the anti-clockwise direction towards the telescopic spine 704, according to an embodiment of the present invention. According to an embodiment of the present invention, the hinge mechanism may enable the legs 716 to be converted from the folded mode to the stand mode and/or the cart mode by rotating the legs 716 in the clockwise direction towards the ground surface. According to embodiments of the present invention, the legs 716 may comprise the release buttons 718 that may be provided to control the rotation of the legs 716. The legs 716 may be rotated by pressing the release buttons 718 towards each other that may release the legs 716 and enable the rotation of the legs 716, according to embodiments of the present invention. According to an embodiment of the present invention, the legs 716 of the mobile foldable instrument stand 700 may further comprise a plurality of rear bumpers 740a-740b (hereinafter referred to as the rear bumpers 740) attached near the wheels 714. The rear bumpers 740 may be designed to provide a cushion to the mobile foldable instrument stand 700 in the stand mode, according to an embodiment of the present invention. Further, the rear bumpers 740 may be provided to lift the wheels 714 of the mobile foldable instrument stand 700 to 0.75 inch above a ground surface when the mobile foldable instrument stand 700 is in the stand mode, according to embodiment of the present invention. According to embodiments of the present invention, the rear bumpers 740 may be made up of a material such as, but not limited to, a rubber, a plastic, and so forth. Embodiments of the present invention are intended to include or otherwise cover any type of the material for the rear bumpers 740 including known, related art, and/or later developed technologies.

According to embodiments of the present invention, the base 702 may further comprises the front foot 712 attached to the base 702 through the hinge mechanism. The hinge mechanism may enable the front foot 712 to be rotated in the clockwise direction and/or the anti-clockwise direction, according to embodiments of the present invention. Further, the front foot 712 may comprise a plurality of front bumpers 742a-742b attached to a bottom surface of the front foot 712, according to an embodiment of the present invention. The front bumpers 742 may be designed to provide a cushion to the mobile foldable instrument stand 700 in the stand mode, according to an embodiment of the present invention. According to embodiments of the present invention, the front bumpers 742 may be made up of a material such as, but not limited to, a rubber, a plastic, and so forth. Embodiments of the present invention are intended to include or otherwise cover any type of the material for the front bumpers 742 including known, related art, and/or later developed technologies.

FIG. 7F illustrates a rear perspective view of the mobile foldable instrument stand 700 holding the instrument 738 in the stand mode, according to another embodiment of the present invention. The handle 706 may comprise the hollow tubes 728 that may be designed to form the yoke of the mobile foldable instrument stand 700 for securely holding the instrument 738, according to embodiments of the present invention. In an embodiment of the present invention, the instrument 738 may be inserted into the yoke through an opening between the hollow tubes 728 of the handle 706. Further, the forks 710 may be hollow tubes that may be designed to provide the support to the base of the instrument 738 held within the mobile foldable instrument stand 700. According to embodiments of the present invention, the telescopic spine 704 may be adjusted at the intermediate position for using the mobile foldable instrument stand 700 in the stand mode.

Further, the distal end of the backrest 708 may comprise the guide holes 720 for accepting the plurality of the lower bungee cords 722a-722b, according to embodiments of the present invention. According to embodiments of the present invention, each of the lower bungee cords 722a-722b may comprise a first end and a second end, according to embodiments of the present invention. The first end of each of the lower bungee cords 722a-722b may be anchored near a distal end of the telescopic spine 704 to the base 702, in an embodiment of the present invention. In an embodiment of the present invention, the second end of the lower bungee cords 722a may comprise the hook 744a and the second end of the lower bungee cords 722b may comprise the hook 744b. The hook 744a-744b may be securely engaged near the backrest 708 of the mobile foldable instrument stand 700 in the stand mode and/or the folded mode, according to embodiments of the present invention.

Figure 8C:
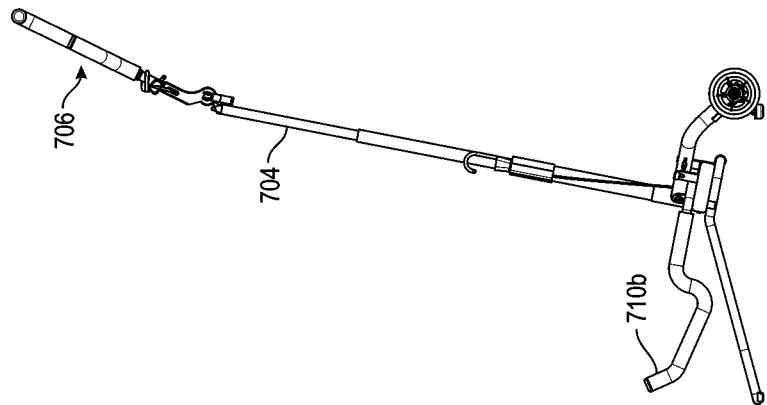
FIG. 8C illustrates a side view of the mobile foldable instrument stand in the cart mode, according to another embodiment of the present invention.
Figure 8B:
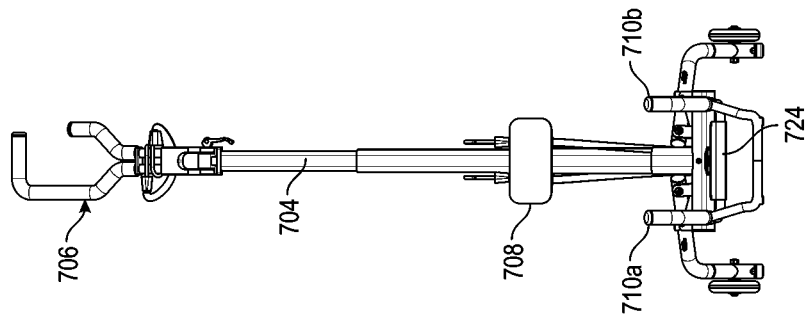
FIG. 8B illustrates a front view of the mobile foldable instrument stand in the cart mode, according to another embodiment of the present invention.
Figure 8A:
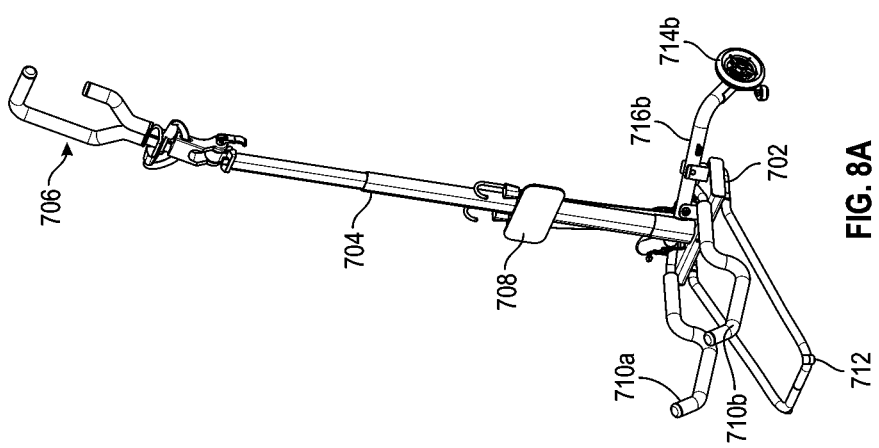
FIG. 8A illustrates a right side perspective view of the mobile foldable instrument stand in a cart mode, according to another embodiment of the present invention.

FIG. 8A illustrates a right side perspective view of the mobile foldable instrument stand 700 in the cart mode, according to another embodiment of the present invention. The mobile foldable instrument stand 700 comprises the base 702, the telescopic spine 704, the handle 706, the backrest 708 and the forks 710. The base 702 may be designed to provide the rigid support to the mobile foldable instrument stand 700 and other components of the mobile foldable instrument stand 700 in the stand mode and/or the cart mode, according to embodiments of the present invention. According to embodiments of the present invention, the base 702 may further comprises the front foot 712 attached to the base 702 through the hinge mechanism. According to embodiments of the present invention, the base 702 may further comprise the wheels 714 attached to the rear end of the base 702 through the legs 716. Further, the legs 716 may be connected to the base 702 using the hinge mechanism, according to embodiments of the present invention. The telescopic spine 704 may be provided for adjusting the height of the mobile foldable instrument stand 700, according to embodiments of the present invention.

The backrest 708 may be the flat plate attached near the center of the telescopic spine 704, according to embodiments of the present invention. The backrest 708 may provide the support to the instrument 738 held within the mobile foldable instrument stand 700 in the cart mode, according to embodiments of the present invention. Further, the forks 710 may be designed to rest over the front end of the base 702 when the mobile foldable instrument stand 700 is in the stand mode and/or the cart mode, according to embodiments of the present invention.

FIG. 8B illustrates a front view of the mobile foldable instrument stand 700 in the cart mode, according to another embodiment of the present invention. The telescopic spine 704 may be adjusted in the cart mode, according to embodiments of the present invention. In an embodiment of the present invention, the telescopic spine 704 is fully extended when the user pulls the handle 706 upwards along the vertical axis of the mobile foldable instrument stand 700, then the telescopic spine 704 may be in the cart mode. According to embodiments of the present invention, the connector 724 of the handle 706 may enable the user to rotate the handle 706 for adjusting the handle 706 in one of, the cart mode, the stand mode, and the folded mode. In an embodiment of the present invention, if the handle 706 is rotated in the clockwise direction to an angle of 90 degrees from the stand mode, then the handle 706 may be in the cart mode. In another embodiment of the present invention, if the handle 706 is rotated in the anti-clockwise direction to an angle of 180 degrees from the folded mode, then the handle 706 may be in the cart mode.

FIG. 8C illustrates a side view of the mobile foldable instrument stand 700 in the cart mode, according to another embodiment of the present invention.

FIG. 9A illustrates a right side perspective view 900 of the mobile foldable instrument stand 700 in the cart mode holding an instrument case 906, according to another embodiment of the present invention. The telescopic spine 704 may be adjusted in the cart mode, according to embodiments of the present invention. The mobile foldable instrument stand 700 is in the cart mode such that the telescopic spine 704 is extended fully when the user pulls the handle 706 upwards along the vertical axis of the mobile foldable instrument stand 700. According to embodiments of the present invention, the connector 726 of the handle 706 may enable the user to rotate the handle 706 for adjusting the handle 706 in the cart mode. In an embodiment of the present invention, if the handle 706 is rotated in the clockwise direction to an angle of 90 degrees from the stand mode, then the handle 706 may be in the cart mode. In another embodiment of the present invention, if the handle 706 is rotated in the anti-clockwise direction to an angle of 180 degrees from the folded mode, then the handle 706 may be in the cart mode.

Further, the hollow tubes 728 of the handle 706 may comprise the plurality of upper bungee cords 734a-734b that may be provided for securely holding the instrument case 906 within the mobile foldable instrument stand 700 in the cart mode. According to embodiments of the present invention, each of the upper bungee cords 734a-734b may comprise the first end and the second end, according to embodiments of the present invention. The first end of each of the upper bungee cords 734a-734b may be anchored within the hollow tubes 728 of the handle 706, in an embodiment of the present invention. In an embodiment of the present invention, the second end of the upper bungee cords 734a may comprise the hook 736a and the second end of the upper bungee cords 734b may comprise the hook 736b. The hooks 736a-736b may be engaged with each other to securely tighten the upper bungee cords 734a-734b around the instrument case 906 when the instrument case 906 is held within the mobile foldable instrument stand 700, according to embodiments of the present invention.

Further, the lower bungee cords 722a-722b may be provided for securely holding the instrument case 906 within the mobile foldable instrument stand 700 in the cart mode. According to embodiments of the present invention, each of the lower bungee cords 722a-722b may comprise the first end and the second end, according to embodiments of the present invention. The first end of each of the lower bungee cords 722a-722b may be anchored near the distal end of the telescopic spine 704 to the base 702, in an embodiment of the present invention. Further, the distal end of the backrest 708 may comprise the guide holes 720 for accepting the plurality of lower bungee cords 722a-722b, according to embodiments of the present invention. In an embodiment of the present invention, the second end of the lower bungee cords 722a may comprise the hook 744a and the second end of the lower bungee cords 722b may comprise the hook 744b. The hook 744a-744b may be provided to enable the user to securely tighten the lower bungee cords 722a-722b around the instrument case 906 when the instrument case 906 is held within the mobile foldable instrument stand 700 by engaging the hook 744a and the hook 744b with each other, according to embodiments of the present invention.

FIG. 9B illustrates a front view 902 of the mobile foldable instrument stand 700 in the cart mode holding the instrument case 906, according to another embodiment of the present invention. The upper bungee cords 734a-734b may be engaged with each other by the user to securely tighten the instrument case 906 with the mobile foldable instrument stand 700, according to embodiments of the present invention. Further, the lower bungee cords 722a-722b may be engaged with each other by the user to securely tighten the instrument case 906 with the mobile foldable instrument stand 700, according to embodiments of the present invention.

FIG. 9C illustrates a side view 904 of the mobile foldable instrument stand 700 in the cart mode holding the instrument case 906, according to another embodiment of the present invention. The user of the mobile foldable instrument stand 700 may securely tighten the upper bungee cords 734a-734b around the instrument case 906 and the lower bungee cords 722a-722b around the instrument case 906 when the instrument case 906 is held within the mobile foldable instrument stand 700, according to embodiments of the present invention.

Figure 10C:
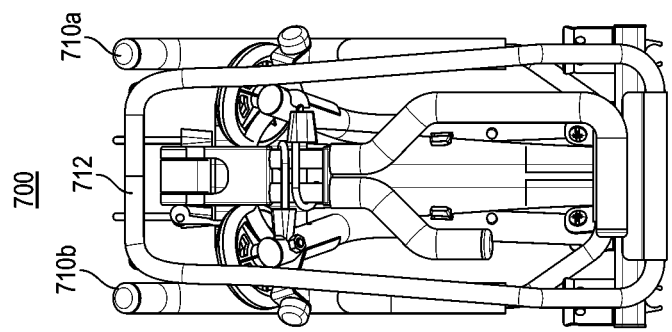
FIGS. 10A-10D illustrate different views of the mobile foldable instrument stand in a folded mode, according to another embodiment of the present invention.
Figure 10B:
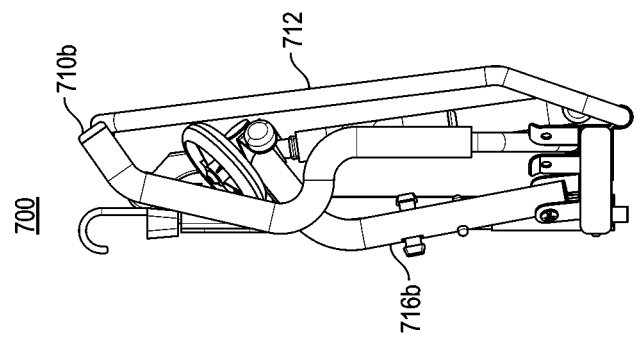
Figure 10A:
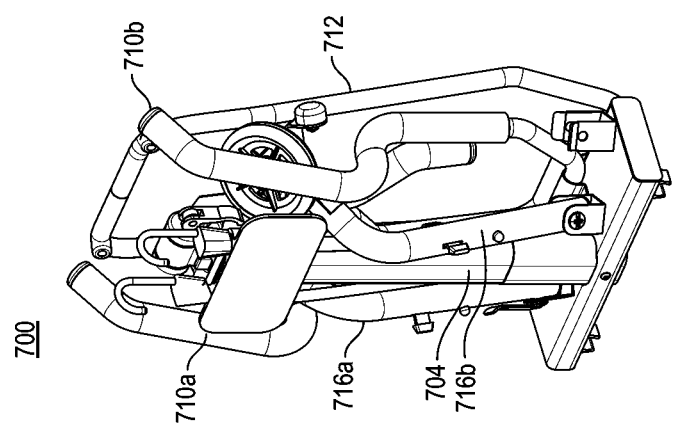

FIGS. 10A-10D illustrate different views of the mobile foldable instrument stand 700 in the folded mode, according to another embodiment of the present invention. FIG. 10A illustrates a right side front perspective view of the mobile foldable instrument stand 700 in the folded mode, according to embodiments of the present invention. In an embodiment of the present invention, for the folded mode, the handle 706 may be rotated in the clockwise direction to an angle of 270 degrees from the stand mode. In another embodiment of the present invention, for the folded mode, the handle 706 may be rotated in the clockwise direction to an angle of 180 degrees from the cart mode. Further, the telescopic spine 704 of the mobile foldable instrument stand 700 may be adjusted in the folded mode, according to embodiments of the present invention. In an embodiment of the present invention, the telescopic spine 704 may be fully collapsed by the user by pushing the handle 706 downwards along the vertical axis of the mobile foldable instrument stand 700. Further, the legs 716 may be rotated by pressing the release buttons 718 towards each other that may release the legs 716 and enable the rotation of the legs 716 in the anti-clockwise direction towards the telescopic spine 704 in the folded mode, according to embodiments of the present invention. Furthermore, the forks 710 attached to the base 702 through the hollow connector 724 (as shown in the FIG. 7A) may be rotated in the clockwise direction towards the telescopic spine 704, according to an embodiment of the present invention. Furthermore, the front foot 712 may then be rotated using the hinge mechanism in the anti-clockwise direction to the angle of 270 degrees towards the telescopic spine 704 for getting the mobile foldable instrument stand 700 in the folded mode, according to an embodiment of the present invention.

FIG. 10B illustrates a side view of the mobile foldable instrument stand 700 in the folded mode, according to embodiments of the present invention.

FIG. 10C illustrates a rear view of the mobile foldable instrument stand 700 in the folded mode, according to embodiments of the present invention.

Figure 10D:
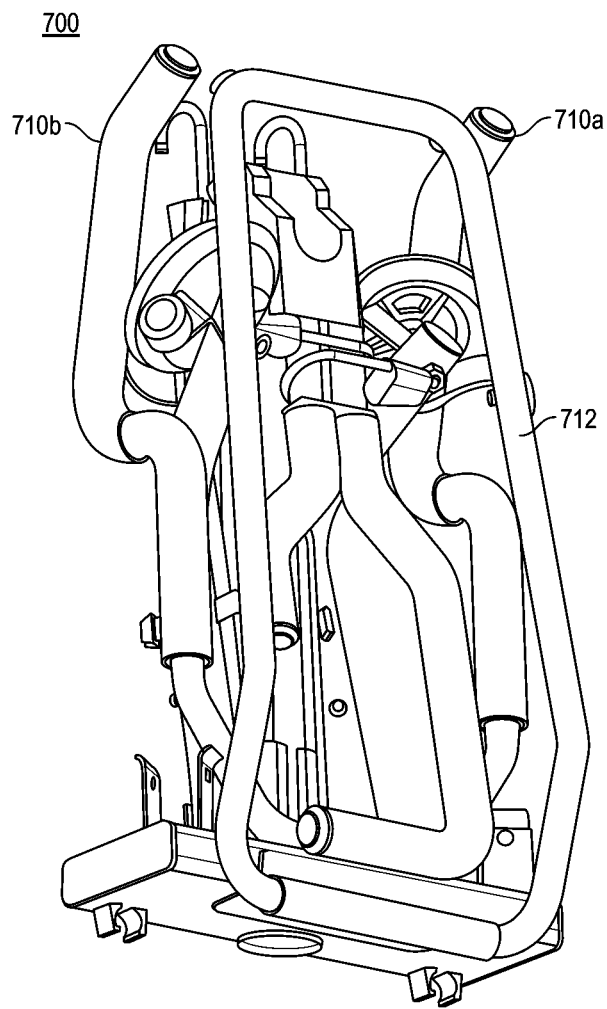

FIG. 10D illustrates a rear, left side perspective view of the mobile foldable instrument stand 700 in the folded mode, according to embodiments of the present invention. The forks 710 may be rotated towards the telescopic spine 704 in the clockwise direction, according to an embodiment of the present invention. The front foot 712 may then be rotated in the anti-clockwise direction towards the telescopic spine 704 for getting the mobile foldable instrument stand 700 in the folded mode, according to an embodiment of the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, configurations, and aspects, includes providing instrument stands and processes in the absence of items not depicted and/or described herein or in various embodiments, configurations, or aspects hereof, including in the absence of such items as may have been used in previous instrument stands or processes, e.g., for improving performance, achieving ease and/or reducing cost of implementation.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed.

Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

What is claimed is:

1. A mobile foldable instrument stand comprising:
   a base to provide a rigid support to the mobile foldable instrument stand;
   a telescopic spine having a proximal end and a distal end, wherein the distal end is attached to the base;
   a rotatably hinged handle attached to the proximal end of the telescopic spine, wherein the rotatably hinged handle comprises an opening to secure an instrument to the mobile foldable instrument stand;
   a fork attached to the base to accept and secure an instrument;
   a wheel attached to the base to enable movement of the mobile foldable instrument stand; and
   a foot attached to the base to provide support for the mobile foldable instrument stand.

2. The mobile foldable instrument stand of claim 1, wherein the wheel, fork and foot are foldable for storing the mobile foldable instrument stand.

3. The mobile foldable instrument stand of claim 1, wherein rotation of the rotatably hinged handle is controlled using a cam lever lock.

4. The mobile foldable instrument stand of claim 1, wherein the rotatably hinged handle and fork are covered with a foam padding.

5. The mobile foldable instrument stand of claim 1, wherein the rotatably hinged handle is movably secured along the telescopic spine to accommodate instruments of multiple sizes.

6. The mobile foldable instrument stand of claim 1, wherein the foot comprises a cushion.

7. A mobile foldable instrument stand comprising:
   a base to provide a rigid support to the mobile foldable instrument stand;
   a telescopic spine having a proximal end and a distal end, said distal end attached to the base;
   a hinged handle attached to the proximal end of the telescopic spine, the hinged handle having an opening to secure an instrument to the mobile foldable instrument stand;
   a fork attached to the base to accept and secure an instrument;
   a wheel attached to the base to enable movement of the mobile foldable instrument stand;
   a backrest attached to the telescopic spine; and
   an elastic cord for securing an instrument.

8. The mobile foldable instrument stand of claim 7, wherein the backrest comprises a guide hole for securing the elastic cord.

9. The mobile foldable instrument stand of claim 7, wherein the hinged handle comprises a guide hole for securing the elastic cord.

10. The mobile foldable instrument stand of claim 7, wherein the hinged handle is controlled using a cam lever lock.

11. The mobile foldable instrument stand of claim 7, wherein the hinged handle and fork are covered with a foam padding.

12. The mobile foldable instrument stand of claim 7, wherein the backrest comprises a flat plate.

13. The mobile foldable instrument stand of claim 7, further comprising a foldable foot attached to the base to provide additional support to the mobile foldable instrument stand.

14. The mobile foldable instrument stand of claim 7, wherein the telescopic spine is adjustable to varying heights to accommodate instruments of multiple sizes.

15. The mobile foldable instrument stand of claim 7, wherein the wheel, fork and hinged handle are foldable for storing the mobile foldable instrument stand.

16. A mobile foldable instrument stand comprising:
   a base to provide a rigid support to the mobile foldable instrument stand;
   an adjustable spine having a proximal and distal end, said distal end attached to the base;
   a handle attached to the proximal end of the adjustable spine, comprising a lever for holding and securing an instrument to the mobile foldable instrument stand;
   a fork attached to the base to accept and secure the instrument;
   an elastic cord to securely hold the instrument to the mobile foldable instrument stand;
   a backrest attached to the adjustable spine; and
   a wheel attached to the base for enabling movement of the mobile foldable instrument stand.

17. The mobile foldable instrument stand of claim 16, wherein the handle, fork, and wheel are foldable for storing the mobile foldable instrument stand.

18. The mobile foldable instrument stand of claim 16, wherein the handle comprises a guide hole for securing the elastic cord.

19. The mobile foldable instrument stand of claim 16, wherein the adjustable spine comprises a guide hole for securing the elastic cord.

20. The mobile foldable instrument stand of claim 16, wherein the handle further comprises a concave recess to accept an instrument.

* * * * *